US011110947B2

(12) United States Patent
Finstad et al.

(10) Patent No.: US 11,110,947 B2
(45) Date of Patent: Sep. 7, 2021

(54) CARTS WITH SHELVES

(71) Applicant: Cannon Equipment LLC, Cannon Falls, MN (US)

(72) Inventors: Clemance Bernard Finstad, Bay City, WI (US); Keith Jackson, Minneapolis, MN (US)

(73) Assignee: CANNON EQUIPMENT LLC, Cannon Falls, MN (US)

( * ) Notice: Subject to any disclaimer, the term of this patent is extended or adjusted under 35 U.S.C. 154(b) by 0 days.

(21) Appl. No.: 16/913,197

(22) Filed: Jun. 26, 2020

(65) Prior Publication Data

US 2021/0245790 A1 Aug. 12, 2021

Related U.S. Application Data

(60) Provisional application No. 62/971,636, filed on Feb. 7, 2020.

(51) Int. Cl.
*B62B 3/00* (2006.01)
*B62B 5/00* (2006.01)
*A47F 5/025* (2006.01)
*A47B 63/06* (2006.01)

(52) U.S. Cl.
CPC .............. *B62B 3/005* (2013.01); *B62B 3/004* (2013.01); *B62B 5/0009* (2013.01); *A47B 63/062* (2013.01); *A47F 5/025* (2013.01)

(58) Field of Classification Search
CPC ....... B62B 3/005; B62B 3/004; B62B 5/0009; A47B 63/062; A47F 5/025
See application file for complete search history.

(56) References Cited

U.S. PATENT DOCUMENTS

| | | | |
|---|---|---|---|
| 2,598,800 | A | 6/1952 | Kopper |
| 2,647,287 | A | 8/1953 | Jones |
| 2,992,010 | A | 7/1961 | Sides |
| 3,191,959 | A | 6/1965 | Heimbruch |
| 3,197,224 | A | 7/1965 | Kappen |
| 3,272,528 | A | 9/1966 | Young et al. |
| 3,519,286 | A | 7/1970 | Andersen |
| 3,628,805 | A | 12/1971 | Archer |
| 3,840,242 | A | 10/1974 | Craig et al. |
| 3,840,243 | A | 10/1974 | Rheinhart |
| 3,861,768 | A | 1/1975 | Wilson |
| 3,920,258 | A | 11/1975 | Lundstrom et al. |
| 3,953,044 | A | 4/1976 | Wilson |
| 3,971,568 | A | 7/1976 | Wright |
| 3,977,689 | A | 8/1976 | Rosa |
| 3,981,510 | A | 9/1976 | Gustafsson |

(Continued)

FOREIGN PATENT DOCUMENTS

| | | |
|---|---|---|
| FR | 2849637 | 1/2003 |
| JP | 2002114340 | 4/2002 |

*Primary Examiner* — James A Shriver, II
*Assistant Examiner* — Michael T. Walsh
(74) *Attorney, Agent, or Firm* — Andrus Intellectual Property Law, LLP

(57) ABSTRACT

A cart for transporting objects has a base and a first end wall and an opposite second end wall extending from the base. A sidewall extends from the base and between the end walls such that the base, the first end wall, the second end wall, and the sidewall define an interior space of the cart. A hinge couples a door to the first end wall such that the door can be pivoted into different positions. One or more arms extend into the interior space to support and retain objects therein.

17 Claims, 21 Drawing Sheets

(56) References Cited

U.S. PATENT DOCUMENTS

| | | |
|---|---|---|
| 3,984,117 A | 10/1976 | Bates et al. |
| 4,045,043 A | 8/1977 | Fourrey |
| 4,065,141 A | 12/1977 | Wilson |
| 4,086,263 A | 4/1978 | Rowley |
| 4,097,097 A | 6/1978 | Hosko |
| 4,159,831 A | 7/1979 | Schorr |
| 4,169,416 A | 10/1979 | Haynes |
| 4,180,277 A | 12/1979 | Romero |
| 4,222,579 A | 9/1980 | Frydendal |
| 4,263,749 A | 4/1981 | McDougle |
| 4,346,906 A | 8/1982 | Thorpe |
| 4,351,541 A | 9/1982 | Propst et al. |
| 4,456,273 A | 6/1984 | McKinnon |
| 4,509,805 A | 4/1985 | Welsch |
| 4,542,806 A | 9/1985 | Olson |
| 4,678,090 A | 7/1987 | Ross |
| 4,725,066 A | 2/1988 | Nootenboom et al. |
| 4,895,382 A | 1/1990 | Andersson |
| 4,986,555 A | 1/1991 | Andreen |
| 5,137,403 A | 8/1992 | McCaffrey |
| 5,170,529 A | 12/1992 | Kovacs |
| 5,259,668 A | 11/1993 | Teufel et al. |
| 5,263,701 A | 11/1993 | Kleinhen |
| 5,324,054 A | 6/1994 | Kleier |
| 5,480,187 A | 1/1996 | Binning |
| 5,524,917 A | 6/1996 | Iverson et al. |
| 5,561,887 A | 10/1996 | Neag et al. |
| 5,765,702 A | 6/1998 | Bustos et al. |
| 5,871,108 A | 2/1999 | White |
| 5,873,204 A | 2/1999 | Gehn et al. |
| 5,947,494 A | 9/1999 | Thogersen et al. |
| 6,331,009 B1 | 12/2001 | Wilkinson |
| 6,629,337 B2 | 10/2003 | Nania |
| 6,659,294 B1 | 12/2003 | Simard |
| 6,786,494 B2 | 9/2004 | Garbiso |
| 6,793,630 B2 | 9/2004 | Labrecque et al. |
| 6,811,163 B1 | 11/2004 | Guruléet al. |
| 6,974,042 B2 | 12/2005 | Hall |
| 6,986,527 B2 | 1/2006 | Carver |
| 7,004,489 B2 | 2/2006 | Brown |
| 7,025,548 B2 | 4/2006 | Krawczyk et al. |
| 7,130,190 B1 | 10/2006 | Baker |
| 7,185,899 B2 | 3/2007 | Thiede et al. |
| 7,213,816 B2 | 5/2007 | Gregory et al. |
| 7,229,085 B2 | 6/2007 | Pederson et al. |
| 7,320,472 B2 | 1/2008 | Gregory et al. |
| 7,392,993 B1 | 7/2008 | Prohl et al. |
| 7,419,063 B1 | 9/2008 | Hall |
| 7,484,631 B2 | 2/2009 | Bothun et al. |
| 7,540,510 B2 | 6/2009 | Sparkowski |
| 7,784,613 B2 | 8/2010 | Angeletti et al. |
| 7,993,095 B2 | 8/2011 | Reichler |
| 8,083,194 B2 | 12/2011 | Sandusky et al. |
| 8,403,343 B1 | 3/2013 | Seawel |
| 8,528,918 B2 | 9/2013 | Macias |
| 8,567,795 B2 | 10/2013 | Megens |
| 8,739,986 B2 | 6/2014 | Preidt et al. |
| 8,764,031 B2 | 7/2014 | Finstad et al. |
| 8,931,420 B2 | 1/2015 | Larson et al. |
| 9,139,331 B2 | 9/2015 | Tavolino |
| 9,149,114 B2 | 10/2015 | Finstad, III et al. |
| 9,211,900 B2 | 12/2015 | Knepp |
| 9,227,645 B2 | 1/2016 | Franco |
| 9,283,975 B2 | 3/2016 | McClanahan et al. |
| 9,428,205 B2 | 8/2016 | Jackson et al. |
| 9,738,447 B1 | 8/2017 | Schaftenaar |
| 9,751,549 B2 | 9/2017 | McClanahan et al. |
| 10,092,098 B2 | 10/2018 | Jackson et al. |
| 10,292,491 B1 | 5/2019 | Ke |
| 10,300,741 B2 | 5/2019 | Finstad |
| 10,336,360 B2 | 7/2019 | Jackson et al. |
| 10,538,261 B1 | 1/2020 | Nowe |
| 10,562,362 B2 | 2/2020 | Floyd |
| 2005/0235885 A1 | 10/2005 | Salmanson et al. |
| 2006/0213402 A1 | 9/2006 | Grimal |
| 2010/0072092 A1 | 3/2010 | Anscom et al. |
| 2011/0031259 A1 | 2/2011 | Megens |
| 2011/0204760 A1 | 8/2011 | Finstad, III et al. |
| 2013/0001904 A1 | 1/2013 | Macias |
| 2016/0082996 A1 | 3/2016 | Jackson et al. |
| 2016/0160561 A1 | 6/2016 | Yu |
| 2016/0198848 A1 | 7/2016 | Mogensen et al. |
| 2017/0258222 A1 | 9/2017 | Jackson et al. |
| 2018/0104986 A1 | 4/2018 | Finstad |
| 2019/0071110 A1 | 3/2019 | Finstad et al. |

CARTS WITH SHELVES

CROSS-REFERENCE TO RELATED APPLICATION

The present disclosure is based on and claims priority to U.S. Provisional Patent Application No. 62/971,636 filed Feb. 7, 2020, the disclosure of which is incorporated herein by reference.

FIELD

The present disclosure relates to carts, and specifically relates to carts with hinges, arms, and shelves.

BACKGROUND

The following U.S. Patents are incorporated herein by reference in entirety.

U.S. Pat. No. 5,873,204 discloses a cart having a base and three sidewalls extending there around and upward therefrom. Four wheels are secured at bottom corners of the sidewalls to provide for easy mobility of the cart. A pair of partial doors are hingedly secured to and extend along end edges of two opposing sidewalls for permitting partial coverage of a fourth side of the cart.

U.S. Pat. No. 8,931,420 discloses a cart that can be coupled to a similar cart in a side by side relationship.

U.S. Pat. No. 9,149,114 discloses a cabinet having a deep shelf and at least two opposite sides carrying track means to permit easy adjustment of the shelf between two or more levels by a single person maneuvering only the one accessible end of the shelf.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a cart for transporting objects includes a base and a first end wall and an opposite second end wall extending from the base. A sidewall extends from the base and between the first end wall and the second end wall such that the base, the first end wall, the second end wall, and the sidewall define an interior space and a cart opening. A hinge couples a door to the first end wall such that the door is pivotable in a first direction to a closed position in which the door extends across the cart opening and an opposite second direction to an open position. The hinge has a body that prevents pivoting of the door in the first direction past the closed position and the second direction past the open position.

In certain examples, a cart for transporting objects includes a base, a first end wall, an opposite second end wall, and a sidewall. The first end wall, the second end wall, and the sidewall vertically extend from the base. The sidewall longitudinally extends between the first end wall and the second end wall. The first end wall and the second end wall laterally extend relative to the sidewall. The base, the first end wall, the second end wall, and the sidewall define an interior space and a cart opening. An arm is on the first end wall and in the interior space, and the arm laterally slides along the first end wall and further vertically pivots relative to the first end wall into a raised position in which the arm longitudinally extends away from the first end wall to thereby retain the objects in the interior space.

In certain examples, a cart for transporting objects includes a base, a first end wall, an opposite second end wall, and a sidewall. The first end wall, the second end wall, and the sidewall vertically extend from the base. The sidewall longitudinally extends between the first end wall and the second end wall. The first end wall and the second end wall laterally extend relative to the sidewall. The base, the first end wall, the second end wall, and the sidewall define an interior space and a cart opening. A shelf has a first end, an opposite second end, and a shelf bracket between the first end and the second end. The shelf is laterally movable toward the sidewall into the interior space through the cart opening such that the first end is in a pocket of the first end wall, the second end is in a pocket in the second end wall, and the shelf bracket engages the sidewall. The first end wall, the second end wall, and the sidewall support the shelf relative to the base.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Employees use carts to collect and transport items in facilities, such as warehouses, distribution centers, and commercial stores. In one example, assembly plant employees use carts to transport automotive glass, such as windshields, in an automobile assembly factory. Different types of automobiles require different types, sizes, and shapes of automotive glass, and thus, there is a need in the industry for a cart that safely and efficiently transports different types, sizes, and/or shapes of automotive glass in the automobile assembly factory.

Through research and experimentation, the present inventors have endeavored to develop carts for safely and efficiently transporting items, such as automotive glass. Accordingly, the present inventors invented the carts described herein below. Note that although the below-described carts (and features thereof) are described with reference to transporting automotive glass, such as windshields, the carts may be used to transport any type of object.

Figure 1:
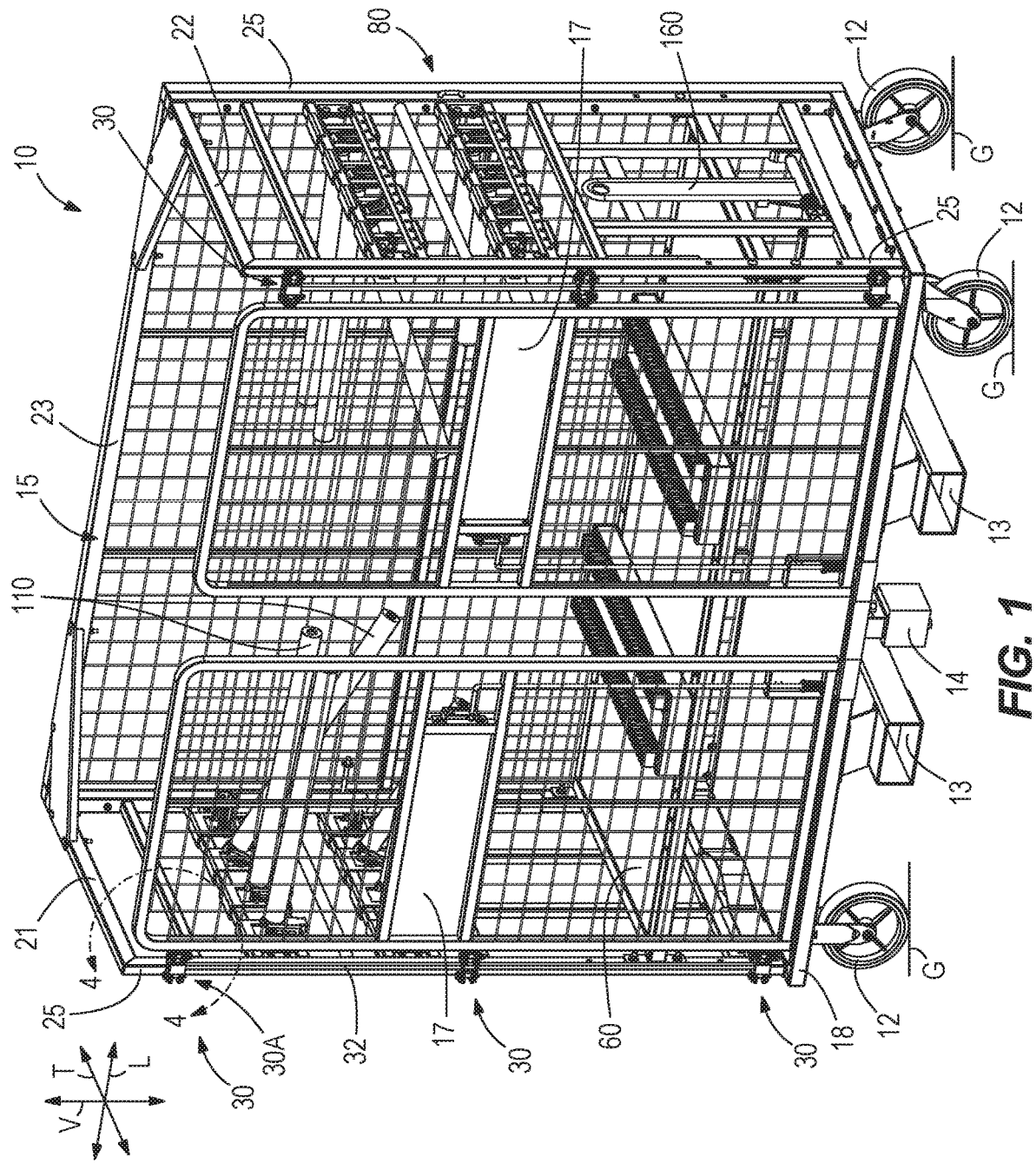
FIG. 1 is a perspective view of an example cart of the present disclosure. Doors of the cart are in closed positions.
Figure 2:
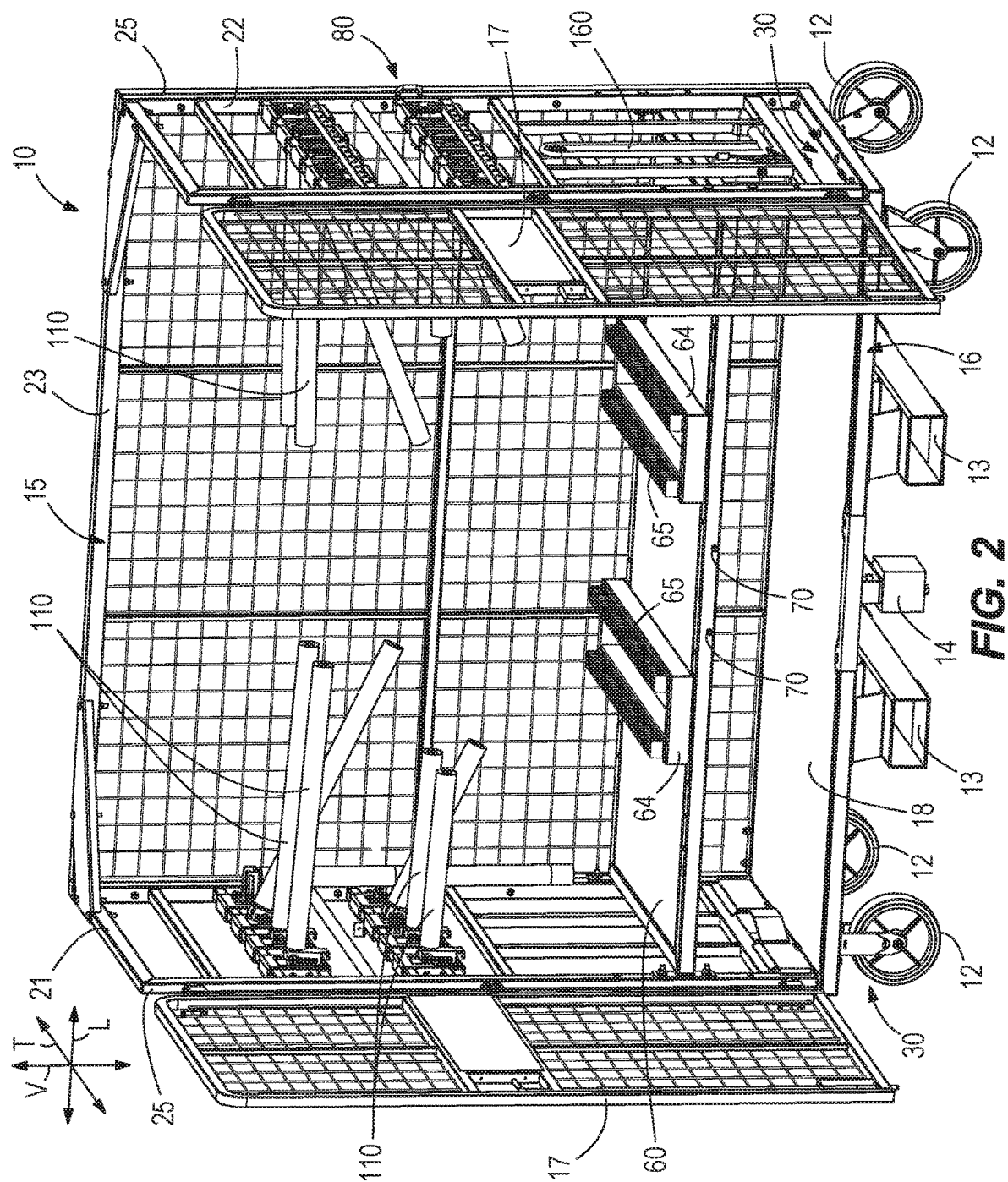
FIG. 2 is a perspective view of the cart of FIG. 1 with the doors in intermediate positions.
Figure 3:
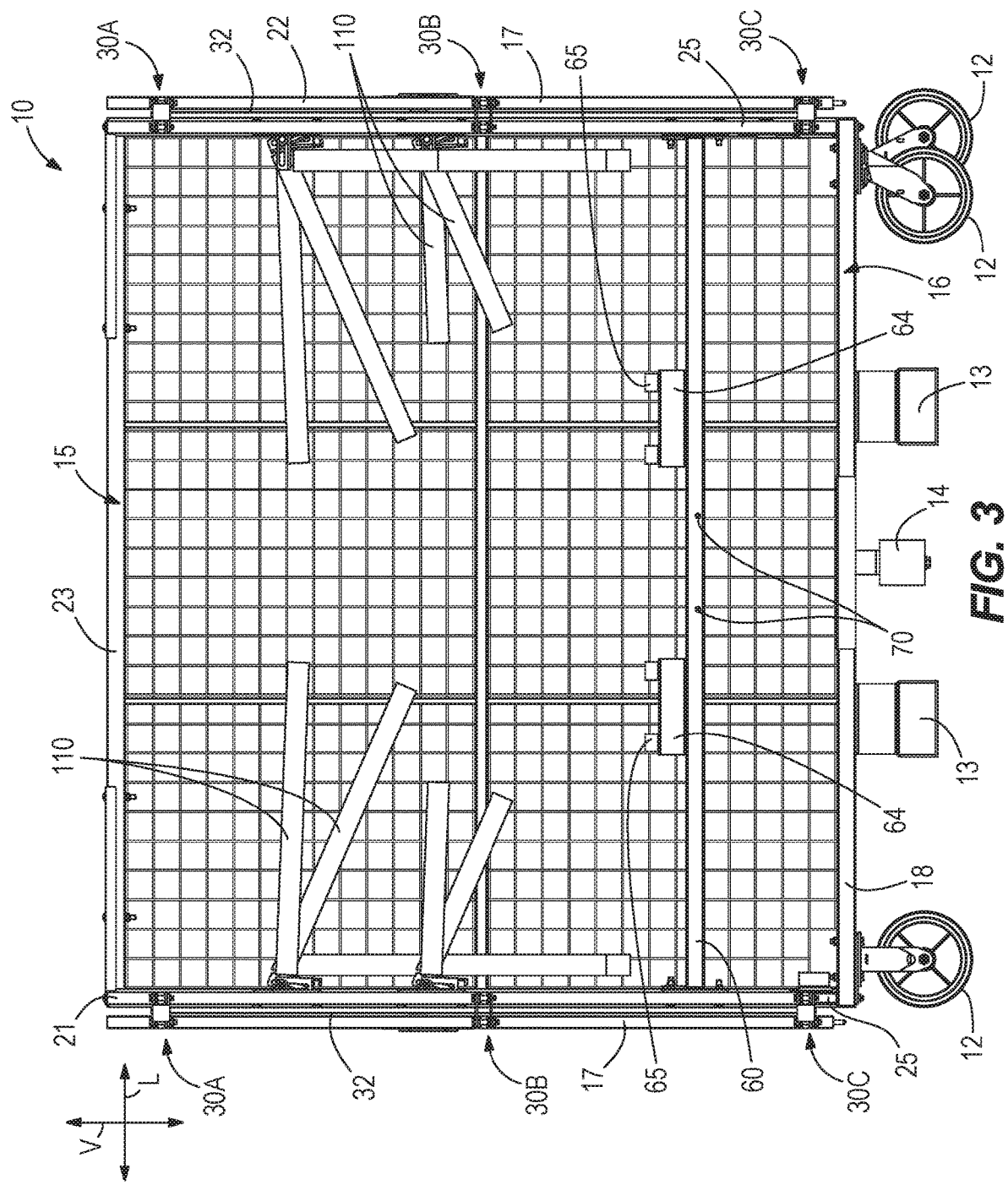
FIG. 3 is a side view of the cart of FIG. 1 with the doors in open positions.

FIGS. 1-3 depict an example cart 10 of the present disclosure. Note that the cart 10 generally extends along a vertical axis V, a transverse or lateral axis T, and a longitudinal axis L. The cart 10 has a base 18, a first end wall 21, an opposite second end wall 22, and a sidewall 23. The end walls 21, 22 and the sidewall 23 vertically extend from the base 18. The end walls 21, 22 also laterally extend toward the sidewall 23, and the sidewall 23 also longitudinally extends between the end walls 21, 22. The base 18, the end walls 21, 22, and the sidewall 23 define an interior space 15 of the cart 10 in which an employee places objects, such as automotive windshields, and a cart opening 16 (FIG. 2) though which the employee moves objects into the interior space 15.

Wheels 12 vertically extend from a lower surface of the base 18 toward the ground G. A pair of fork receivers 13 are coupled to and extend from the lower surface of the base 18, and the fork receivers 13 are for receiving forks of a conventional forklift or order picker (not shown). Furthermore, a lock member 14 is coupled to and extends from the lower surface of the base 18 such that a locking jaw or pallet grab of a conventional forklift or order picker (not shown) can engage and lock onto the lock member 14 when the conventional forklift or order picker (not shown) moves the cart 10. Examples of conventional order pickers are commercially available from Crown Equipment Corporation (e.g., Crown SP Series Order Picker).

The cart 10 includes a pair of doors 17 pivotally coupled to the first and second end walls 21, 22, respectively, such that the employee can pivot the doors 17 into and between different positions. Specifically, the doors 17 are pivotable into and between a closed position (FIG. 1) in which the doors 17 longitudinally extend toward each other and prevent access into the interior space 15 (e.g., the doors 17 close the cart opening 16) and an open position (FIG. 3) in which each door 17 laterally extends along one of the end walls 21, 22. While the doors 17 are in the open position (FIG. 3), the employee places one or more objects (not shown), such as boxes and automotive glass, into the interior space 15 of the cart 10. The end walls 21, 22, the sidewall 23, and the doors 17 include a plurality of metal framing members (e.g., vertical framing members 25) and/or wire mesh.

The cart 10 further includes various components and features that are described herein below. Note that the components and features included with the cart 10, as well as the number of these components and features, can vary based on the specific use or application of the cart 10. Furthermore, certain carts 10 may exclude some of the components and features noted below based on the specific use or application of the cart 10.

Hinges

One or more hinges 30 pivotally couple the doors 17 to the first and second end walls 21, 22 such that each door 17 is pivotable into and between the open position (FIG. 3) and the closed position (FIG. 1), as noted above. Note that FIG. 2 depicts the doors 17 in intermediate positions between the open positions (FIG. 3) and the closed positions (FIG. 1). The number of hinges 30 that couple each door 17 to one of the end walls 21, 22 can vary. The example cart 10 depicted in FIGS. 1-3 has three hinges 30A-C (FIG. 3) that couple each door 17 to each end wall 21, 22.

Figure 4:
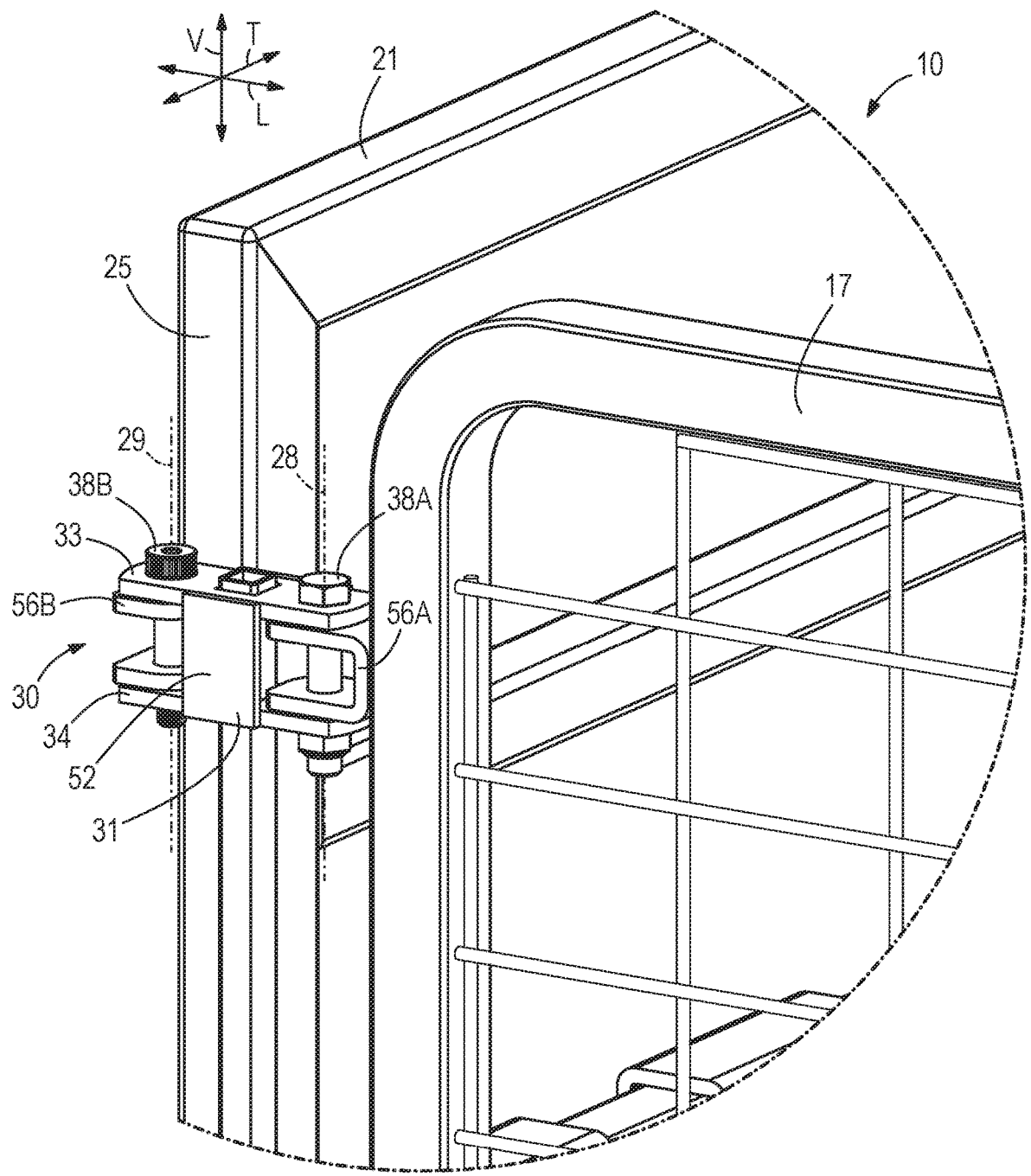
FIG. 4-5 are enlarged views within line 4-4 on FIG. 1 with the door in the closed position.
Figure 5:
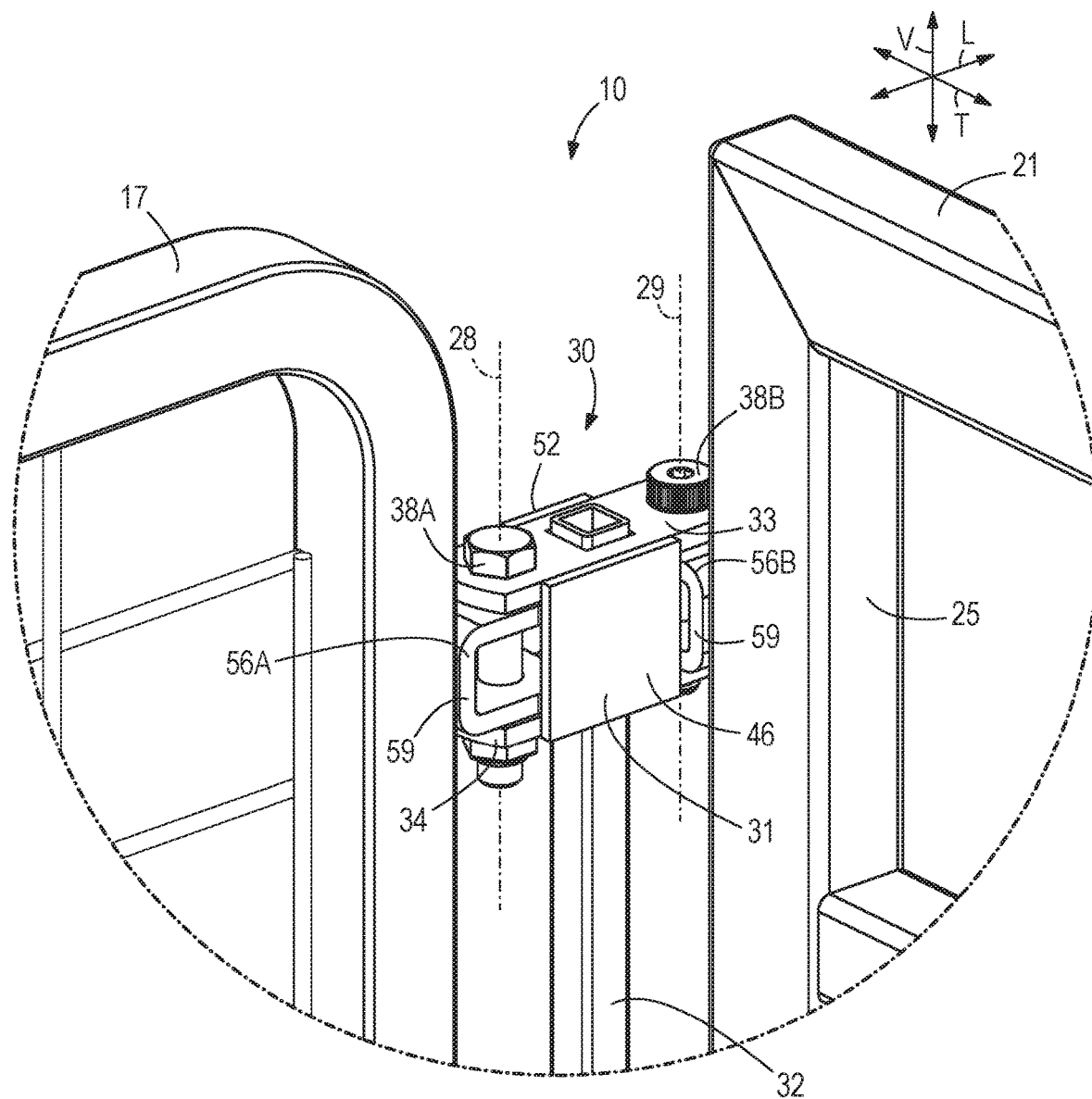
Figure 6:
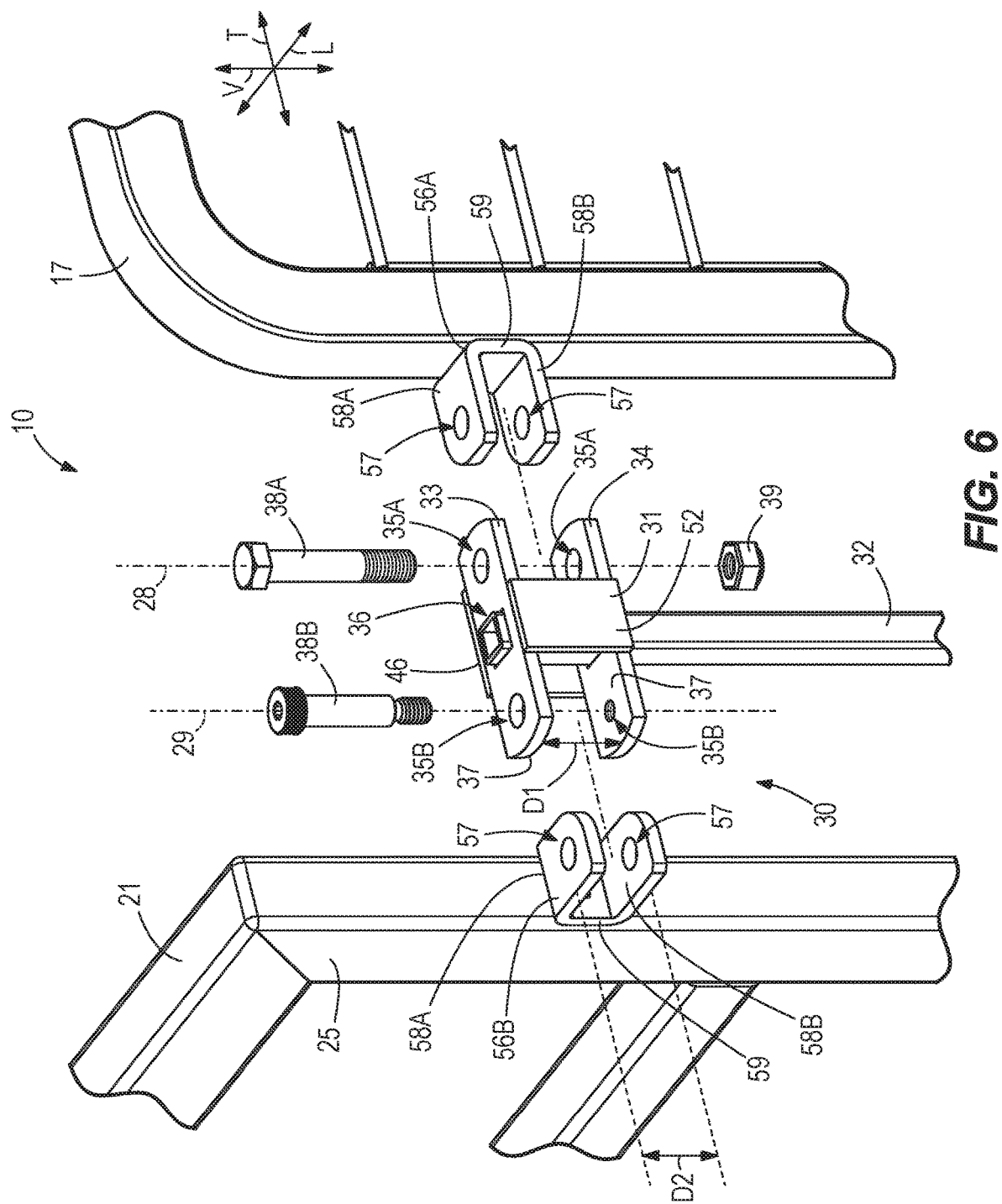
FIG. 6 is an exploded view of an example hinge of the present disclosure connecting a door to an end wall of the cart.

The hinges 30 are described herein below with reference to FIGS. 4-6. Specifically, FIGS. 4-6 depict different views of the hinge 30 that couples the top portion of the door 17 to the top portion of the first end wall 21 (see hinge 30A on FIG. 1).

The hinge 30 includes a hinge body 31 having a pair of opposing shoulder plates, namely a first shoulder plate 33 and a second shoulder plate 34. The shoulder plates 33, 34 are spaced apart from each other. Interior surfaces 37 (FIG. 6) of the shoulder plates 33, 34 face each other and are spaced apart from each other by a first distance D1 (FIG. 6).

A first hole 35A (FIG. 6) in the first shoulder plate 33 aligns with a corresponding first hole 35A in the second shoulder plate 34 such that a first axis 28 and a bolt 38A extend through the aligned first holes 35A. A second hole 35B (FIG. 6) in the first shoulder plate 33 aligns with a corresponding second hole 35B in the second shoulder plate 34 such that a second axis 29 and a bolt 38B extend through the aligned second holes 35B. The axes 28, 29 extend parallel to each other. Note that the type of bolts 38A, 38B can vary. For example, the bolts 38A, 38B can be a shoulder bolt with a nut 39 or a hex bolt with threads at one end that engage threads (not shown) in one the holes 35A, 35B.

Center openings 36 (FIG. 6) in the shoulder plates 33, 34 receive a rod 32 that vertically extends between multiple hinges 30 (see also FIG. 3) such that the hinge bodies 31 move (e.g., pivot) together. In some examples, the rod 32 increases the rigidity of the hinges 30 and the door 17. The size and/or shape of the center openings 36 corresponds to the size and/or shape of the rod 32, and FIG. 6 depicts the rod 32 as an elongated square tube and the shape of the center opening 36 as square.

The hinge body 31 also includes a pair of opposing stop members (FIG. 6) that extend between and couple to the shoulder plates 33, 34. As will be described herein below, the stop members stop or prevent movement of the hinge 30 and/or the door 17 relative to the end wall 21, 22 when the door 17 is in different positions. The stop members are exemplary plates, namely a first side plate 46 and a second side plate 52, however, the stop members can be other suitable types of members such as rods. The side plates 46, 52 are described in greater detail herein below. In one example, the hinge body 31 is generally box-shaped with the ends of the shoulder plates 33, 34 extending therefrom.

The hinge 30 further includes a pair of brackets 56A, 56B (FIG. 6) between the shoulder plates 33, 34 that pivot about the axes 28, 29, respectively. One of the brackets 56A couples to the door 17 and the other bracket 56B couples to the first end wall 21 (FIG. 6). Thus, the hinge body 31 and the brackets 56A, 56B pivotably couple the door 17 to the first end wall 21. Each bracket 56A, 56B includes one or more holes 57 (FIG. 6) that align with the holes 35A, 35B in the shoulder plates 33, 34, respectively. Accordingly, the bolts 38A, 38B extend through the holes 57 in the brackets 56A, 56B and the brackets 56A, 56B pivot about the bolts 38A, 38B and the axes 28, 29.

The size and the shape of the brackets 56A, 56B can vary, and FIG. 6 depicts the brackets 56A, 56B as U-shaped. In this example, each bracket 56A, 56B has a first leg 58A that defines one of the holes 57, an opposing second leg 58B that defines another hole 57, and a base 59 that extends between the legs 58A, 58B (FIG. 6). The holes 57 in the legs 58A, 58B align with each other, and the base 59 couples to the door 17 or the first end wall 21. The bases 59 are removably or fixedly coupled to the door 17 and the first end wall 21. In one example, removable fasteners extend through the bases 59 to couple the brackets 56A, 56B to the door 17 and the first end wall 21. In another example, the bases 59 are welded to the door 17 and the first end wall 21, respectively.

In the example depicted in FIG. 6, the legs 58A, 58B of the brackets 56A, 56B are between the shoulder plates 33, 34 such that there is minimal or no space between the legs 58A, 58B and the adjacent shoulder plates 33, 34. This positioning reduces or prevents sag of the door 17 relative to the first end wall 21. In one non-limiting example, the distance between the outer surfaces of the legs 58A, 58B (see distance D2 of FIG. 6) is equal to or slightly less than the distance between the inner surfaces 37 of the shoulder plates 33, 34 (see distance D1).

In one example, the brackets 56A, 56B remain on the door 17 and/or the first end wall 21 when the employee disconnects the door 17 from the first end wall 21. In this example, the employee removes the bolts 38A, 38B such that the hinge body 31, the door 17, and the first end wall 21 separate from each other. To reconnect the door 17 to the first end wall 21, the employee moves the holes 35A, 35B in the shoulder plates 33, 34 into alignment with the holes 57 in the brackets 56A, 56B, respectively, and inserts the bolts 38A, 38B into the aligned holes 35A, 35B, 57 thereby connecting the door 17 to the first end wall 21 via the hinge 30. In another example, the brackets 56A, 56B are integrally formed with and permanently fixed to the doors 17 and the first end wall 21. In other example, the brackets 56A, 56B are excluded from the hinge 30. In this example, the door 17 and the first end wall 21 define holes that receive the bolts 38A, 38B to connect the hinge 30 to the door 17 and the first end wall 21.

Figure 7:
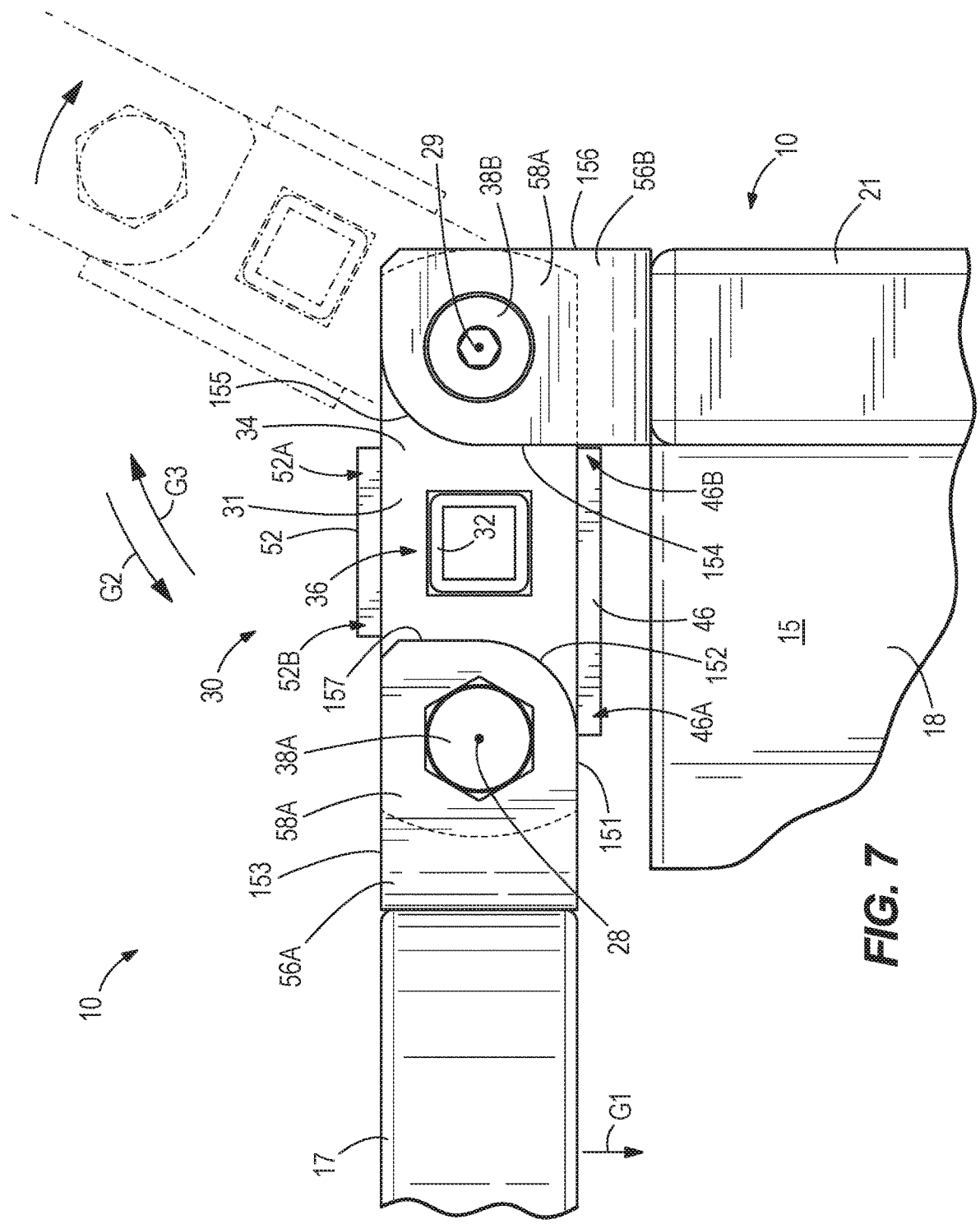
FIG. 7 is an enlarged, top-down plan view of an example hinge of the present disclosure connecting a door to an end wall of the cart. The door is in the closed position.
Figure 8:
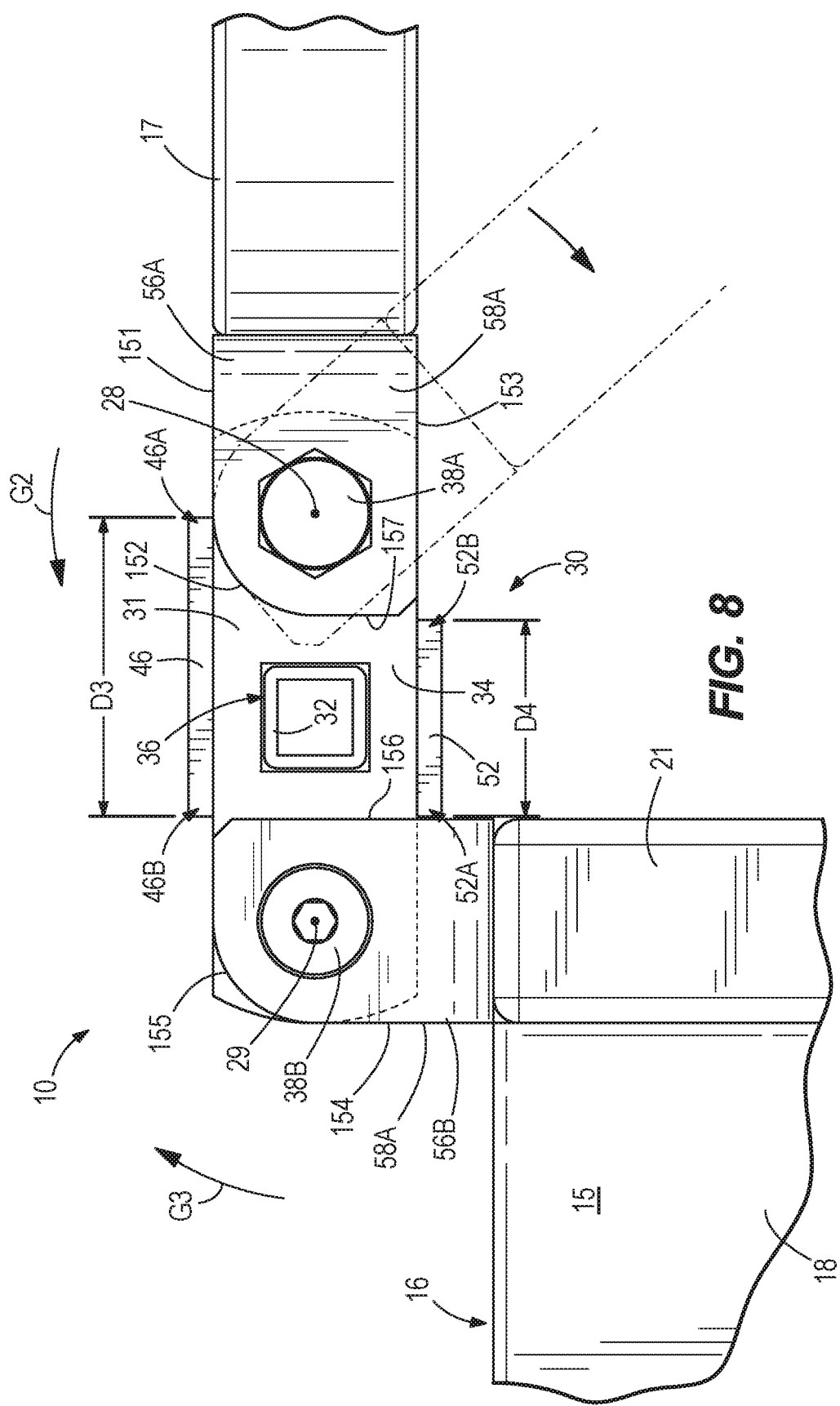
FIG. 8 is another enlarged, top-down plan view of the hinge of FIG. 7 with the door in the intermediate position.
Figure 9:
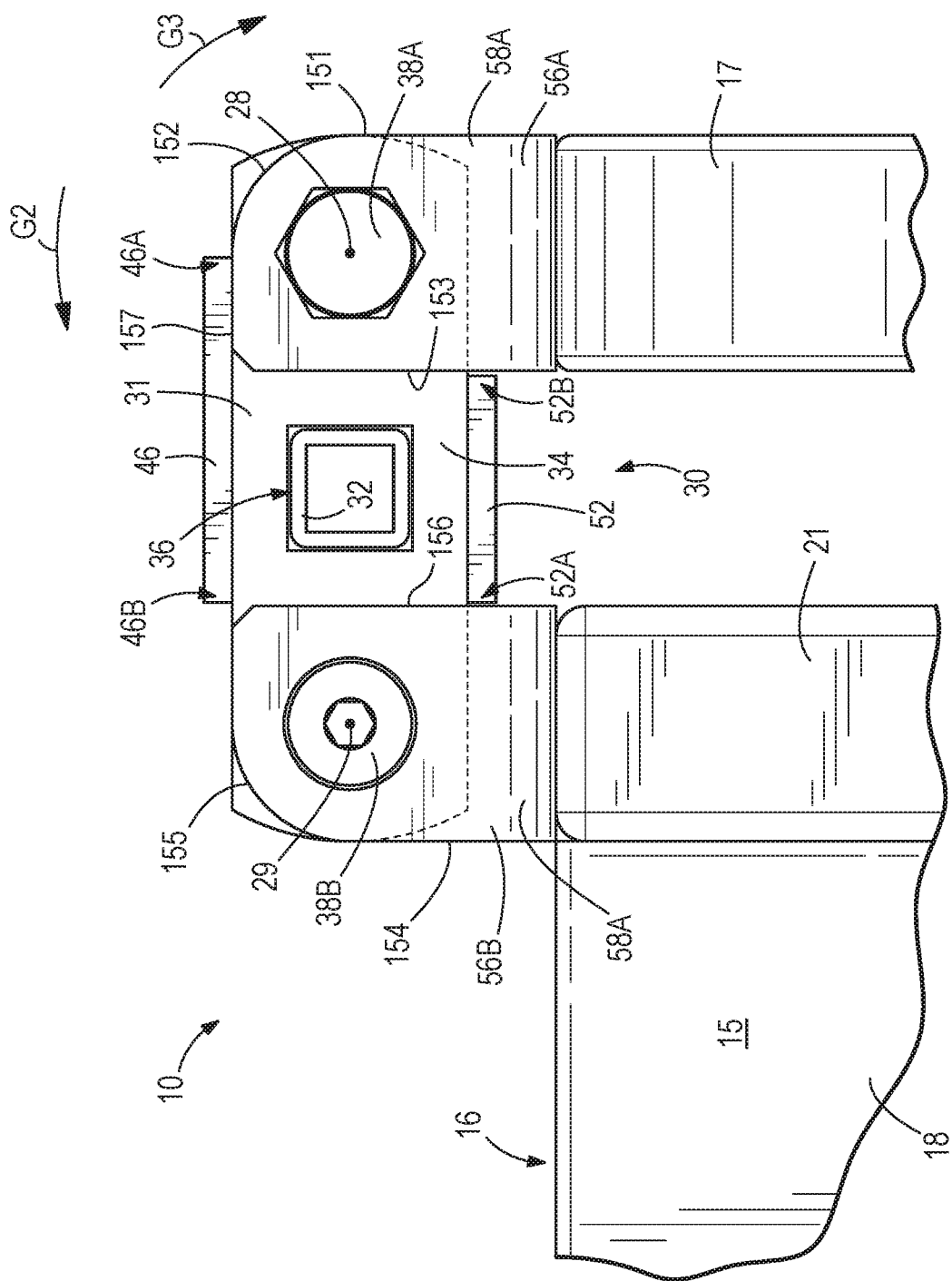
FIG. 9 is another enlarged, top-down plan view of the hinge of FIG. 7 with the door in the open position.

FIGS. 7-9 depict movement of the hinge 30 and the door 17 as the door 17 is moved from the closed position (FIGS. 1 and 7) to the open position (FIGS. 3 and 9). Note that FIGS. 7-9 excludes the upper, first shoulder plate 33 (FIG. 6) to thereby expose the first legs 58A of the brackets 56A, 56B. Further note that while FIGS. 7-9 do not depict the second legs 58B of the brackets 56A, 56B (FIG. 6), the second legs 58B include features similar to the features described with respect to the first legs 58A.

FIG. 7 depicts the door 17 in the closed position (see also FIG. 1). Note that the dashed lines in FIG. 7 depict the door 17 moving toward the intermediate position (FIG. 8). In the closed position, the door 17, the hinge body 31, and the first leg 58A of the first bracket 56A align with each other and the door 17 extends across the cart opening 16 (FIG. 2). The first leg 58A of the second bracket 56B extends transverse to the door 17. The first leg 58A of the first bracket 56A has a first perimeter edge 151 that contacts the first side plate 46 such that the door 17 cannot pivot past the closed position (FIG. 7) in a first direction G1 toward the interior space 15 of the cart 10 (FIG. 2). That is, the first perimeter edge 151 contacts a first end 46A of the first side plate 46 such that the door 17 cannot pivot past the closed position (FIG. 7) and the first bracket 56A cannot further pivot about the first axis 28 (see arrow G2). Additionally, an opposite second end 46B of the first side plate 46 contacts a first perimeter edge 154 of the first leg 58A of the second bracket 56B such that the hinge body 31 cannot pivot about the second axis 29 past the position depicted in FIG. 7 (see arrow G2). Thus, the first side plate 46, and the ends 46A, 46B thereof, prevent pivoting (see arrow G2) of the door 17 past the closed position (FIG. 7). Accordingly, by preventing over-pivoting the door 17 past the closed position (FIG. 7) (as noted above), the first side plate 46 advantageously aligns a door latch (not shown; e.g., a latch with spring pins or rods) on the door 17 with a corresponding latch receiving hole (not shown) in the base 18 (FIG. 1).

FIG. 8 depicts the door 17 in an intermediate position (like the intermediate position of the door 17 depicted in FIG. 2) between the closed position (FIGS. 1 and 7) and the open position (FIGS. 3 and 9) as the employee pivots the door 17 away from the closed position (FIGS. 1 and 7; see arrow G3 on FIG. 8). Note that the dashed lines in FIG. 8 depict the door 17 moving toward the open position (FIG. 9). As the door 17 is pivoted about the second axis 29 (see arrow G3), the hinge body 31 pivots about the second axis 29 (see arrow G3) and the first side plate 46 freely moves along a curved, second perimeter edge 155 of the first leg 58A of the second bracket 56B. Pivoting of the hinge body 31 about the second axis 29 (see arrow G3) stops when a first end 52A of the second side plate 52 contacts a third perimeter edge 156 of the first leg 58A of the second bracket 56B. Thus, the second side plate 52 prevents further pivoting of the hinge body 31 (see arrow G3) past the position depicted in FIG. 8.

As the employee pivots the door 17 from the intermediate position (FIG. 8) to the open position (FIG. 9) (see arrow G3), a curved, second perimeter edge 152 of the first leg 58A of the first bracket 56A passes along the first end 46A of the first side plate 46 until a third perimeter edge 153 of the first leg 58A of the first bracket 56A contacts a second end 52B of the second side plate 52 (see FIG. 9). Thus, the second side plate 52 prevents further pivoting (see arrow G3) of the door 17 in a direction toward the first end wall 21 past the open position (FIG. 9). The first leg 58A of the first bracket 56A also has a fourth perimeter edge 157 that contacts the first plate 46 to the further prevent pivoting (see arrow G3) of the first bracket 56A and the door 17 past the open position (FIG. 9). Note that the door 17 is also pivotable from the open position (FIG. 9) back to the closed position (FIG. 7) (see arrows G2 on FIGS. 7-9). In certain examples, the distance between the first end 46A and the second end 46B of the first plate 46 (see distance D3 on FIG. 8) is greater than the distance between the first end 52A and the second end 52B of the second plate 52 (see distance D4 on FIG. 8). In certain examples, the door 17 pivots 270.0 degrees from the closed position (FIG. 1) to the open position (FIG. 3). In certain examples, each plate 46, 52 extends in parallel planes and the parallel planes extend parallel to the axes 28, 29. In certain examples, the ends 46A, 46B, 52A, 52B of the side plates 46, 52 have edge surfaces that contact the brackets 56A, 56B and/or edges thereof.

Arms

Figure 10:
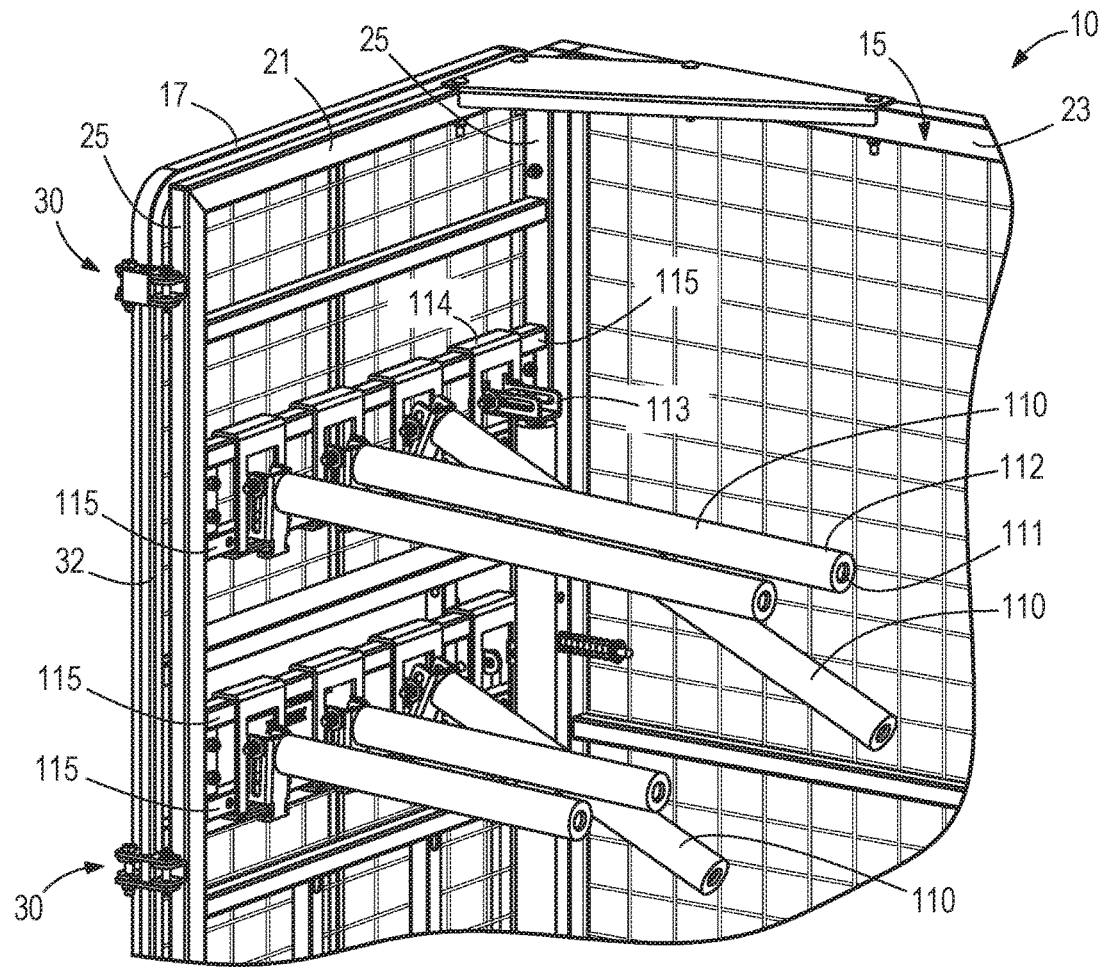
FIG. 10 is a perspective view of multiple arms of the present disclosure on the end wall of the cart.
Figure 11:
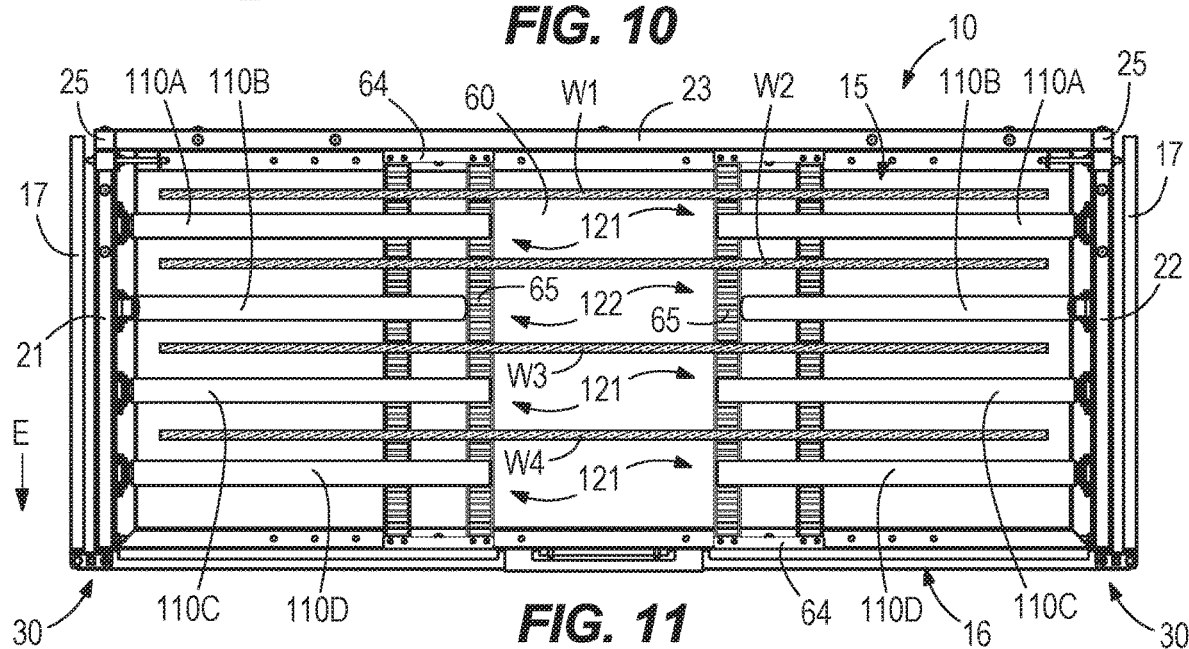
FIG. 11 is a schematic view depicting windshields loaded in the cart and positioned between the arms.

Referring to FIGS. 10-11, the cart 10 includes a plurality of arms 110 on the end walls 21, 22 (FIG. 11) that support objects, such as windshields W1-W4 (FIG. 11), in the interior space 15 of the cart 10. The arms 110 also prevent the windshields W1-W4 from contacting each other and/or damaging each other while in the cart 10. The arms 110 further prevent the windshields W1-W4 from falling out of the interior space 15 through the cart opening 16. Note that the number of arms 110 on the end walls 21, 22 can vary, and the example cart depicted in FIGS. 1-3 and 10-11 includes two vertically stacked rows or sets of arms 110 on both end walls 21, 22. In this example, one row of arms 110 is vertically spaced apart from the other row of arms 110. Thus, the arms 110 support both upper ends and lower ends of the windshields W1-W4.

Described herein below with reference to FIG. 11 is an example sequence for loading and unloading windshields W1-W4 into the interior space 15 of the cart 10. In this example, the employee individually loads each windshield W1-W4 into the interior space 15 and moves each arm 110A-D into a raised position or an angled position (described further herein) such that the arms 110A-D are between each windshield W1-W4. To begin the loading sequence, the employee positions the first windshield W1 in the interior space 15 near the sidewall 23. The bottom edge of the first windshield W1 rests on by one or more mats 65 that are on a shelf 60 (see FIG. 19; described further herein) in the interior space 15 of the cart 10. The employee then moves at least one first arm 110A on each end wall 21, 22 from a lowered position (FIG. 16) into an angled position (FIG. 15) or a raised position (see FIG. 14) to thereby prevent transverse movement (see arrow E) of the first windshield W1 relative to the sidewall 23 and separate the first windshield WI from other subsequently loaded windshields W2-W4. The employee then loads the other windshields W2-W4 one at a time into the cart 10 in a similar manner as described above with respect to the first windshield W1. For example, the employee loads the second windshield W2 into the interior space 15 and moves second arms 110B into the intermediate position (FIG. 15). Then, the employee loads the third windshield W3 into the interior space 15 and moves third arms 110C into the raised position (FIG. 14), and so on.

Figure 16:
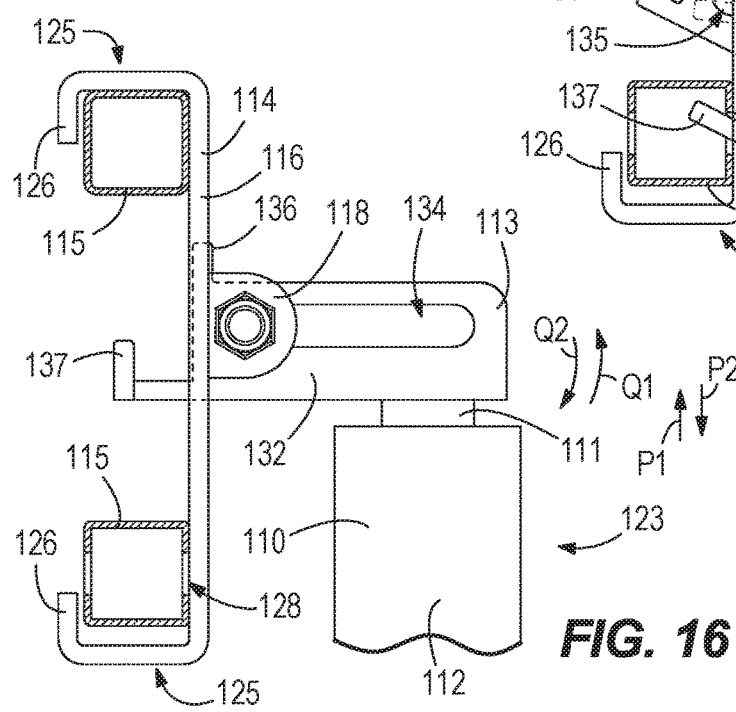
FIG. 16 is a side view of the arm in a lowered position.

To remove the windshields W1-W4 from the cart 10, the employee moves fourth arms 110D that are furthest from the sidewall 23 from the raised position (FIG. 14) to the lowered position (FIG. 16) and removes the fourth windshield W4 from the interior space 15 of the cart 10. The employee then moves the third arms 110C into the lowered position (FIG. 16) and removes the third windshield W3 from the interior space 15 of the cart 10 and so on. The employee repeats these removal steps until all the windshields W1-W4 are removed from the interior space 15. Note that after the employee removes the windshields W1-W4 from the cart 10, the arms 110A-D are each in the lowered position (FIG. 16).

Figure 12:
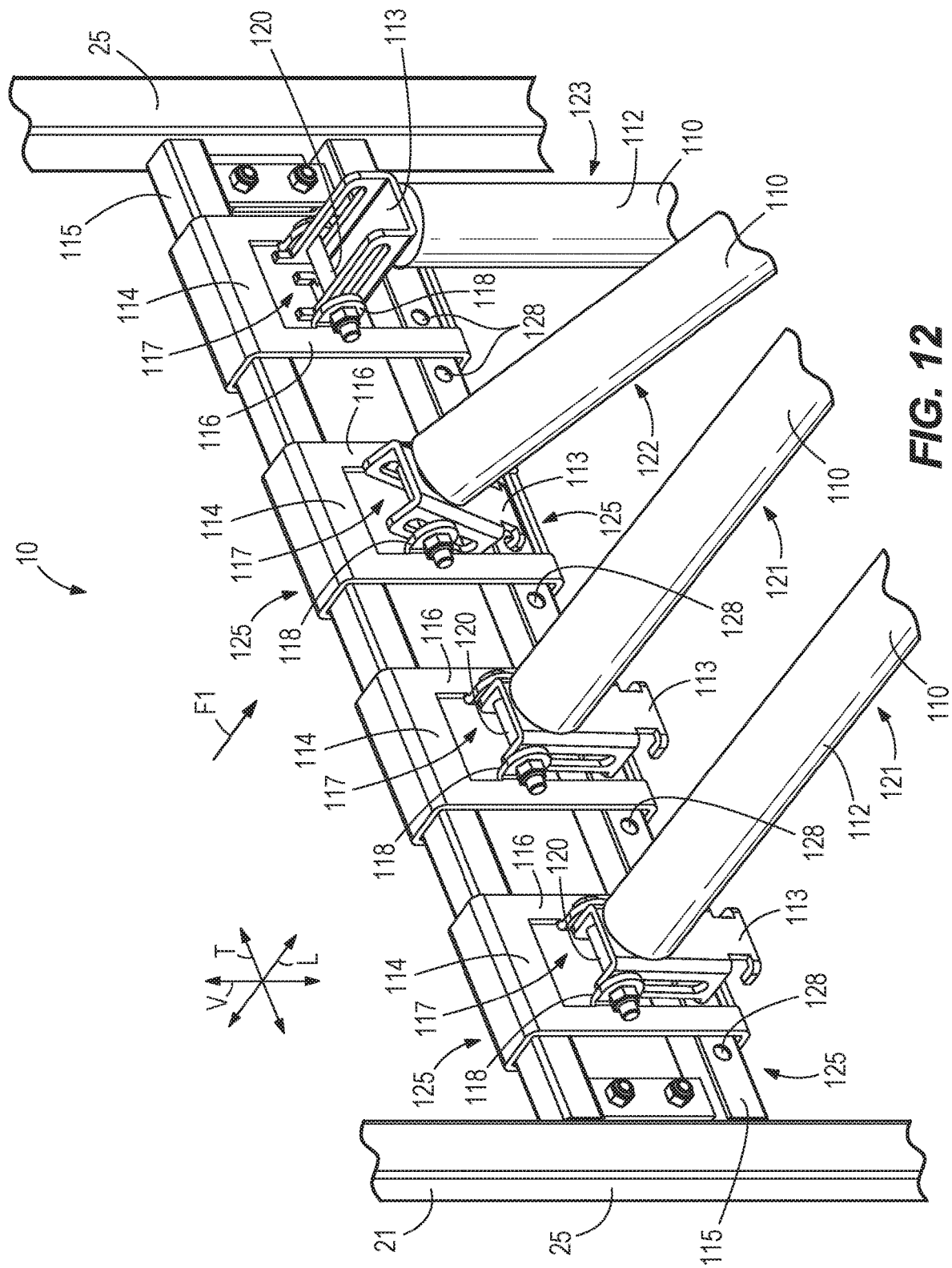
FIG. 12 is an enlarged perspective view of multiple arms.

FIGS. 12-16 depict the arms 110 in greater detail. FIG. 12 depicts one row of four arms 110 on the first end wall 21 of the cart 10. Note that FIG. 12 depicts two of the arms 110 in the raised position (see arrow 121), one of the arms 110 in the angled position (see arrow 122), and one of the arms 110 in the lowered position (see arrow 123).

Each arm 110 has a center member 111 elongated along a center axis (not shown) (e.g., metal or plastic rod, circular tube, square tube) and a sleeve 112 of resilient material such as foam or rubber (see also FIG. 14) covering the center member 111. The center member 111 extends from a base 113 that couples to and pivots relative to a bracket 114 that is on the first end wall 21. Specifically, the bracket 114 is on one or more rails 115 that extend between vertical framing members 25 of the first end wall 21 (FIG. 2). At least one of the rails 115 includes a plurality of holes 128 that receive tabs 136, 137 that extend from the base 113 (described further herein).

The brackets 114 are slidable along the rails 115 into different lateral positions to thereby accommodate the windshields (see FIG. 11). The bracket 114 has a base plate 116 with an opening 117 and opposing flanges 118 that extend in a longitudinal first direction away from the first end wall 21 (see arrow F1). Each flange 118 has a hole (not shown) and the holes align with each other such that a bolt 120 extends there through. The bracket 114 also has opposing ends 125 with lips 126 (FIG. 14) that extend toward each other. The ends 125 and the lips 126 at least partially surround the rails 115 to prevent the arm 110 from falling off the rails 115.

Figure 13:
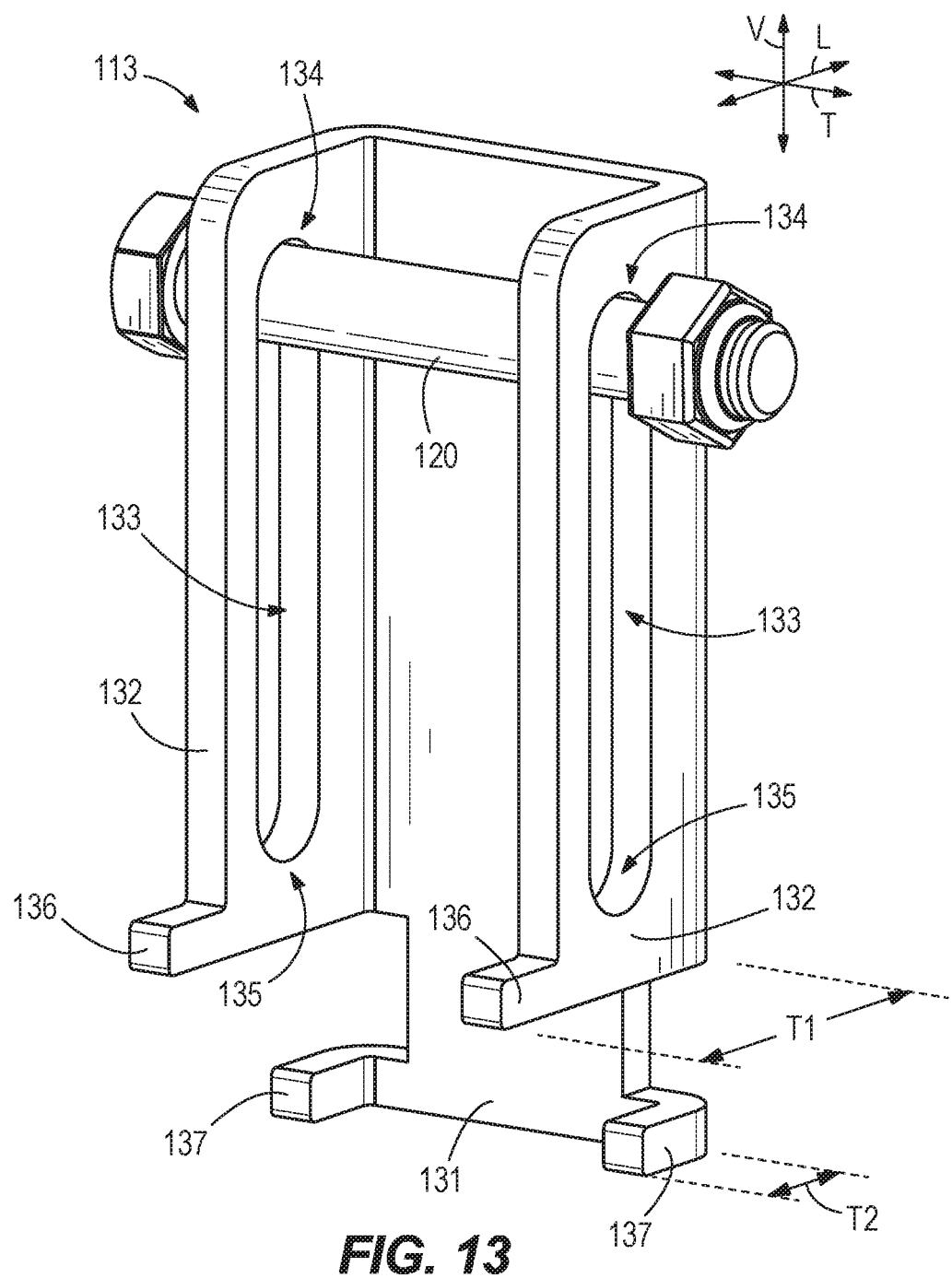
FIG. 13 is a perspective view of a base of an arm.

Referring to FIG. 13, the bolt 120 also extends through slots 133 in the base 113. Accordingly, the base 113 pivots about the bolt 120 and moves relative to the bracket 114 (FIG. 12). The base 113 has a body 131 and a pair of opposing legs 132 that extend from the body 131. Each leg 132 has one of the slots 133 in which the bolt 120 slides (described further herein), and the slot 133 has a first end 134 and an opposite second end 135. The base 113 also includes one or more first tabs 136 and one or more second tabs 137 spaced apart from the first tabs 136. The first tabs 136 extend from the legs 132, and the second tabs 137 extend from the body 131. The first tabs 136 extend a first tab distance T1 from the body 131, and the second tabs 137 extend a second tab distance T2 from the body 131. The second tab distance T2 is less than the first tab distance T1. Note that in this example, the first tabs 136 extend from the legs 132, however, in other examples the first tabs 136 extend from the body 131.

Figure 14:
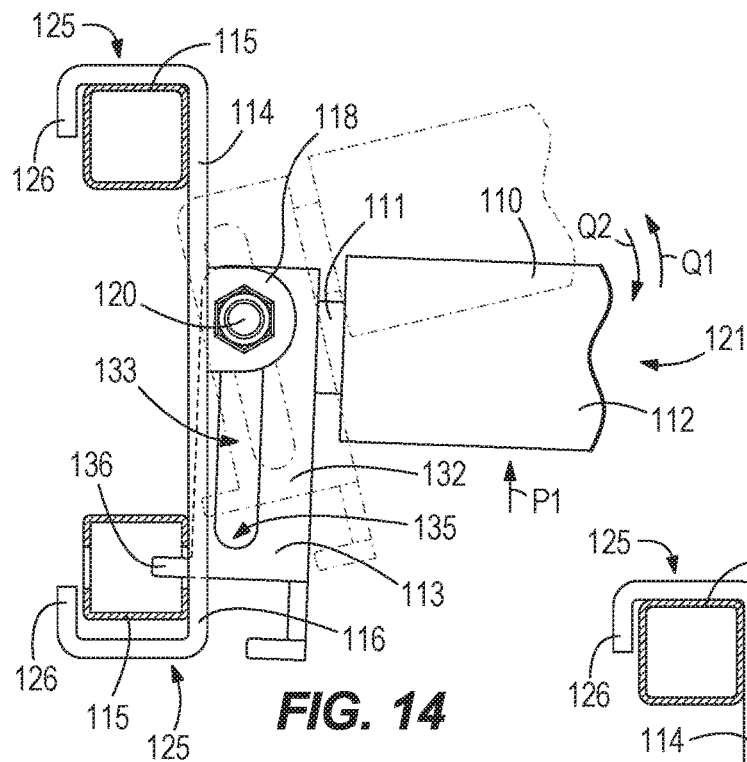
FIG. 14 is a side view of an arm in a raised position.
Figure 15:
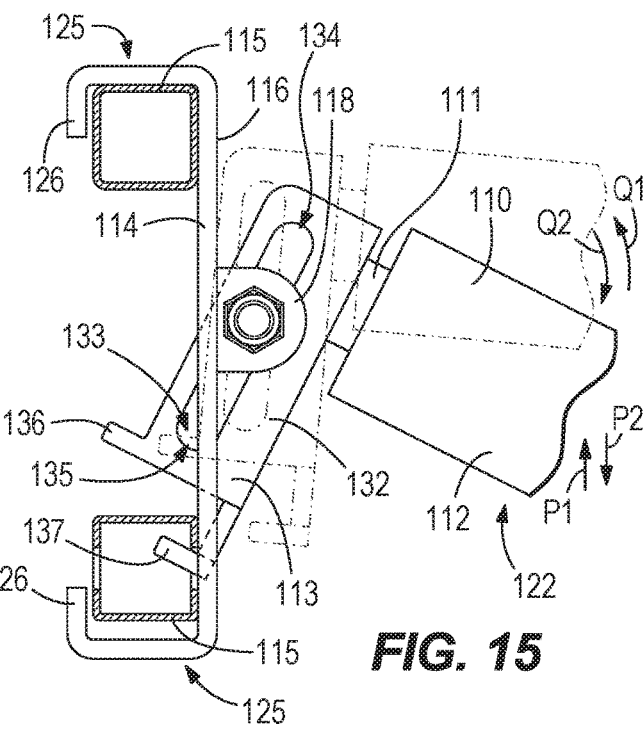
FIG. 15 is a side view of the arm in an angled position.

FIGS. 14-16 depict movement of the arm 110 into different positions. FIG. 14 depicts the arm 110 in the raised position. While in the raised position, the bolt 120 is at the first end 134 of the slot 133 and the first tabs 136 are in the holes 128 (FIG. 12) in the rail 115. Thus, the arm 110 is locked in the raised position and cannot inadvertently move into the other positions.

To move the arm 110 from the raised position (FIG. 14) to the angled position (FIG. 15) or the lowered position (FIG. 16), the employee applies a force (see arrow P1) to the center member 111 and the sleeve 112 to thereby pivot the base 113 in a first direction (see arrow Q1) about the bolt 120. As the base 113 pivots, the first tabs 136 move out of the holes 128 (FIG. 12) in the rail 115. Thus, the employee can freely slide the base 113 along the bolt 120 (see dashed lines in FIG. 14) and thereby move the arm 110 to the angled position (FIG. 15) or the lowered position (FIG. 16).

To move the arm 110 into the angled position (FIG. 15), the employee moves the base 113 such that the bolt 120 is between the ends 134, 135 of the slot 133 (see dashed lines on FIG. 15). The employee then pivots the base 113 in a second direction (arrow Q2) such that the second tabs 137 move into the holes 128 in the rails 115 (see solid lines on FIG. 15) and the arm 110 is in the angled position (FIG. 15). Note that while the arm 110 is in the angled positon (FIG. 15), the first tabs 136 and a portion of the legs 132 extend through the opening 117 in the bracket 114 and between the rails 115 (FIG. 12). Also note that the angle of the center member 111 and the sleeve 112 relative to the bracket 114 and/or the first end wall 21 (FIG. 1) when the arm 110 is in the angled position can vary.

The employee moves the arm 110 from the angled position (FIG. 15) to the raised position (FIG. 14) by pivoting the base 113 in the first direction (arrow Q1) about the bolt 120 such that the second tabs 137 move out of the holes 128 (FIG. 12) in the rails 115. The employee then slides the base 113 along the bolt 120 until the bolt 120 is at or near the first end 134 of the slot 133 (see dashed lines in FIG. 14). The employee then pivots the base 113 in the second direction (arrow Q2) to thereby move the first tabs 136 into the holes 128 in the rails 115 (FIG. 12). Thus, the arm 110 is in the raised position (FIG. 14).

Alternatively, the employee moves the arm 110 from the angled position (FIG. 15) to the lowered position (FIG. 16) by pivoting the base 113 in the first direction (arrow Q1) about the bolt 120 such that the second tabs 137 move out of the holes 128 (FIG. 12) in the rails 115. The employee then slides the base 113 along the 120 (see arrow P1) such that the bolt 120 is at or near the second end 135 of the slot 133 (see FIG. 16). The employee then releases the arm 110 and the base 113 pivots in the second direction (see arrow Q2) due to gravity and the arm 110 moves into the lowered position (FIG. 16). When the arm 110 is in the lowered position (FIG. 16), the second tabs 137 extend through the opening 117 in the bracket 114 and between the rails 115 (FIG. 12).

The employee moves the arm 110 from the lowered position (FIG. 15) to the angled position (FIG. 15) or the raised position (FIG. 14) by pivoting the base 113 in the first direction (arrow Q1) and sliding the base 113 along the bolt 120 (see arrow P2; see dashed lines on FIG. 15). The employee slides the base 113 along the bolt 120 into an appropriate position such that further pivoting of the base 113 in the second direction (see arrow Q2) locks the arm 110 in either the angled position (FIG. 15) or the raised position (FIG. 14). That is, the employee pivots the base 113 in the second direction (see arrow Q2) such that the first tabs 136 are moved into the holes 128 in the rails 115 (FIG. 12) thereby locking the arm 110 in the raised position (FIG. 14) or the second tabs 137 are moved into the holes 128 in the rails 115 (FIG. 12) thereby locking the arm 110 in the angled position (FIG. 15).

Movable Shelf

Figure 17:
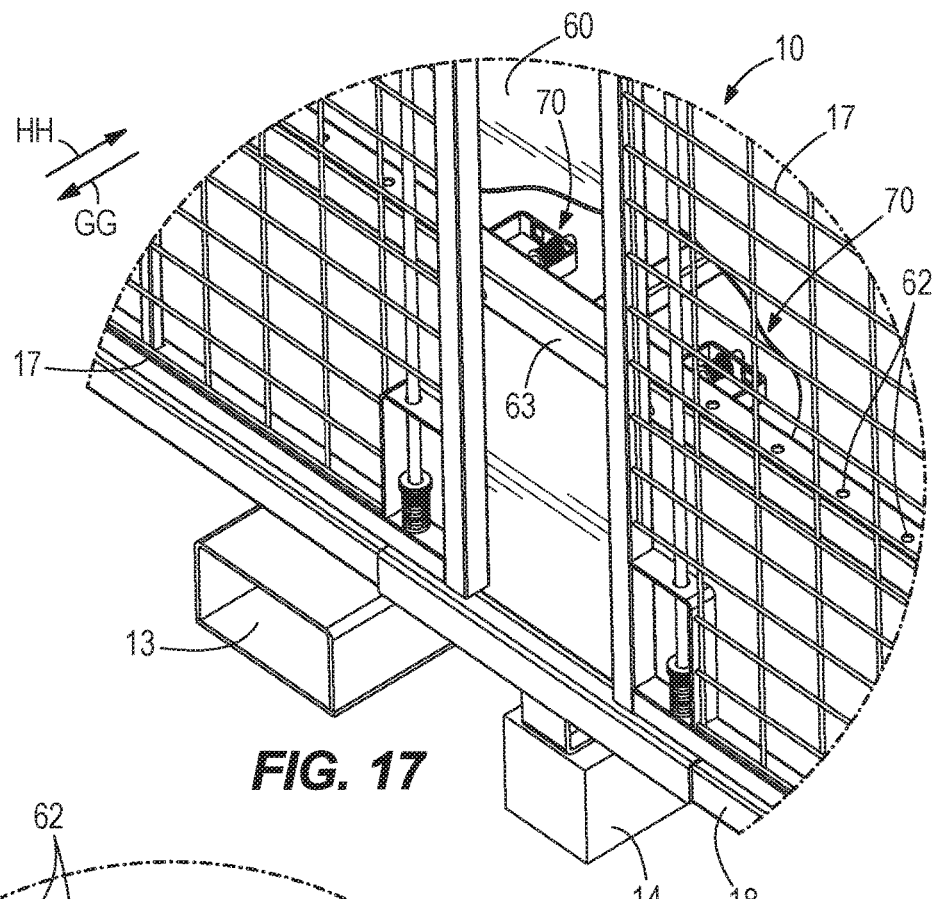
FIG. 17 is a perspective view of a shelf in the cart. The doors of the cart are in the closed position.
Figure 18:
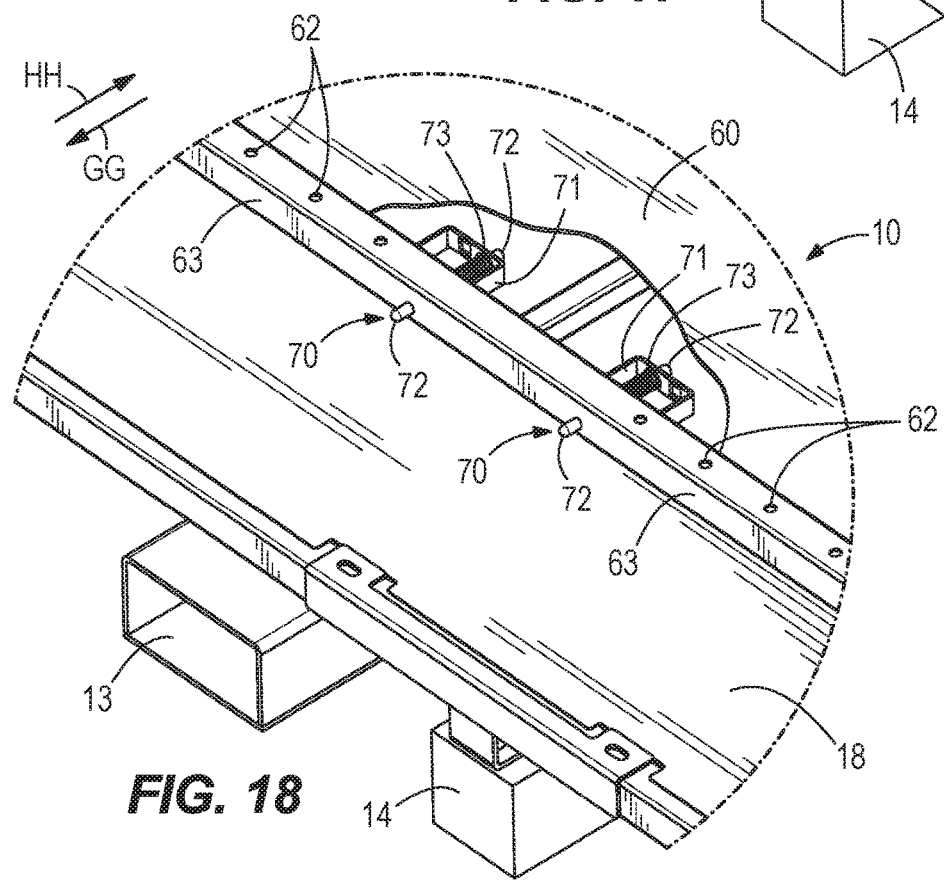
FIG. 18 is an enlarged view of the shelf of FIG. 17 with the doors in the intermediate or open position (note the doors are not depicted in FIG. 18).

FIGS. 17-20 depicts a movable shelf 60 of the cart 10. The shelf 60 is in the interior space 15 of the cart 10, and removable fasteners (not shown; e.g., nut and bolt, spring pins) (not shown) secure the shelf 60 to one or more vertical framing members 25 of the end walls 21, 22 such that the shelf 60 is vertically above the base 18 (FIG. 3). The shelf 60 is movable into different vertical positions by inserting the fasteners into holes 26 (FIG. 19) in the vertical framing members 25. Thus, the employee may move the shelf 60 into a desired position such that different items (not shown; e.g., boxes) may be placed between the base 11 and the shelf 60. Note that FIGS. 17-18 depict a portion of the shelf 60 cut-away to expose components of the shelf 60. Note that the features of the shelf 60 described herein above and below can be included with any other example shelves described herein.

Door Bumpers

The shelf 60 has one or more door bumpers 70 (FIG. 17-18) that extend from the perimeter of the shelf 60 in the transverse direction (see arrow GG) to prevent the doors 17 from rattling while the doors 17 are in the closed positions (FIG. 1). Each door bumper 70 has a bracket 71 transversely inwardly extending (see arrow HH) from one of the perimeter rails 63 of the shelf 60. A pin 72 extends through and moves in a hole in the bracket 71 and a hole in the perimeter rail 63. A spring 73 extends along the pin 72 between the bracket 71 and the perimeter rail 63 and biases the pin 72 in a transverse direction (see arrow GG) such that the pin 72 outwardly extends from the perimeter rail 63 (see FIG. 18). As the employee moves the door 17 into the closed position (FIG. 1), the door 17 contacts the pin 72 and transversely inwardly pushes the pin 72 (see arrow HH) against the force of the spring 73. The spring 73 via the pin 72 exerts a force transversely directed away from the shelf 60 (see arrow GG) against the door 17 thereby preventing the door 17 from rattling when the door 17 is in the closed position (see also FIG. 1) (note that rattling of the door 17 may occur when the employee moves the cart 10).

Tray and Mats

Figure 19:
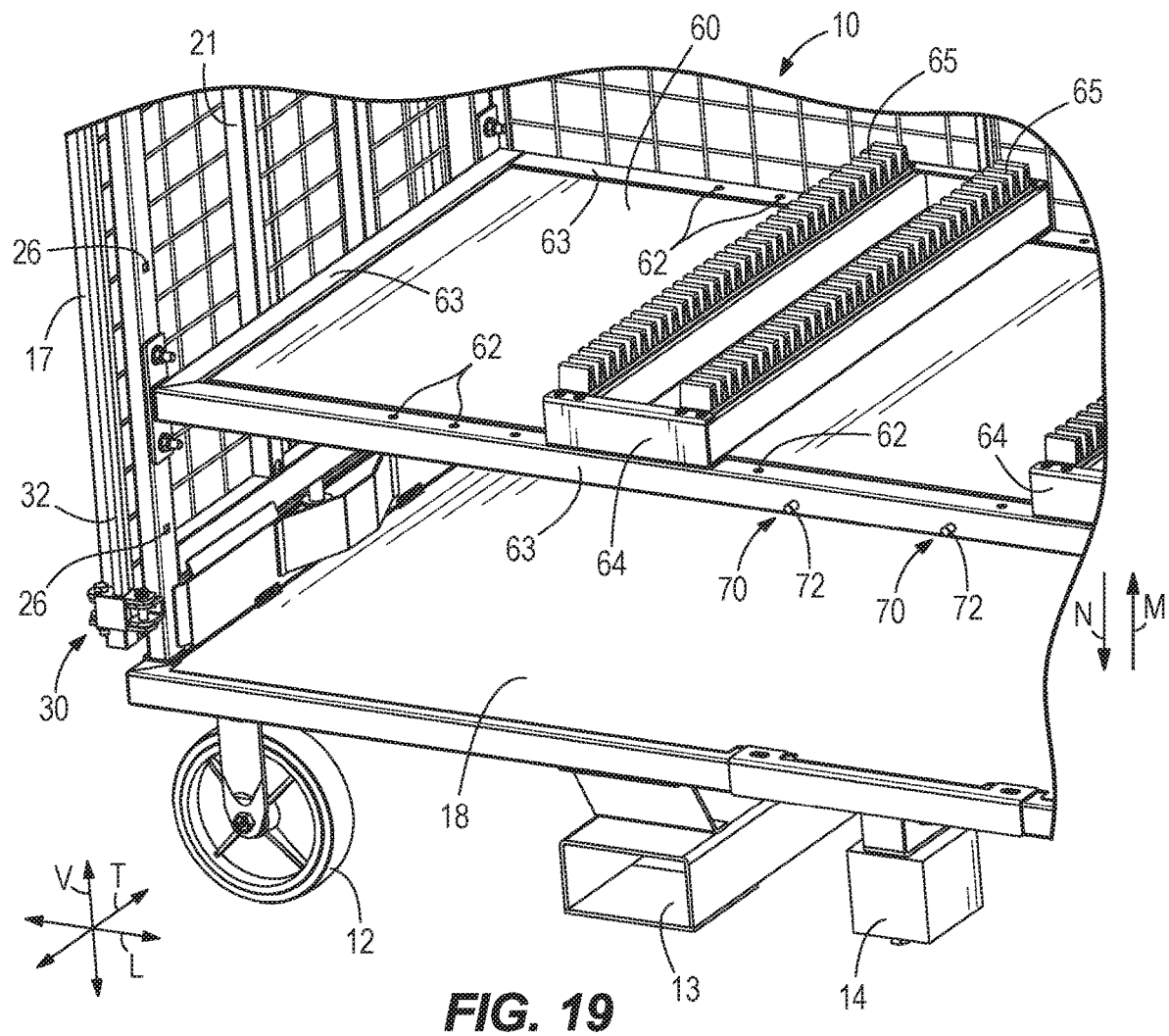
FIG. 19 is a perspective view of the shelf of FIG. 17 with the doors in the open position.
Figure 20:
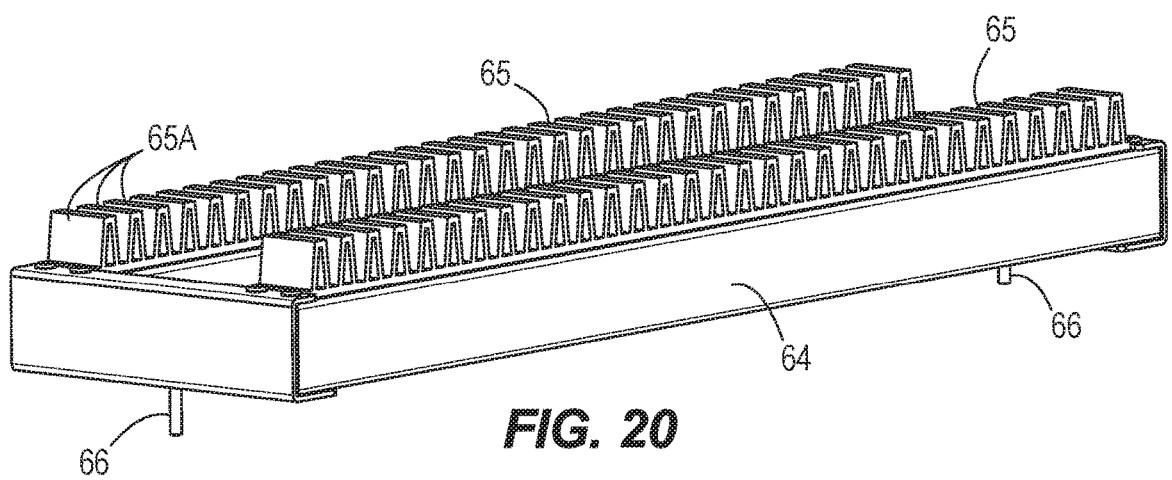
FIG. 20 is a perspective view of a tray according to the present disclosure.

FIGS. 19-20 depict a tray 64 on the shelf 60. The tray 64 includes a pair of mats 65 that support and prevent movement of objects (not shown), such as windshields, placed in the interior space 15 of the cart 10. The size and shape of the mats 65 can vary, and FIG. 20 depicts mats 65 with a plurality of vertically extending fingers 65A. In this example, the bottom edge of a windshield (not shown) rests between two of the fingers 65A. The mats 65 may be formed of any suitable materials, and preferably the mats 65 are formed of a compressible material such as plastic, rubber, and foam. In one example, the material forming the mats 65 has a value on the Shore A Hardness Scale in the range of 60.0-90.0.

Pegs 66 (FIG. 20) extend from the bottom of the tray 64, and holes 62 in the shelf 60 receive the pegs 66 to thereby anchor the tray 64 and prevent inadvertent movement of the tray 64. The employee may change the position of the tray 64 on the shelf 60 by vertically moving the tray 64 away from the shelf 60 (see arrow M), repositioning the tray 64 along the shelf 60, and then inserting the pegs 66 in the holes 62 in the shelf 60 (see arrow N).

Hold-Open Latch

Figure 21:
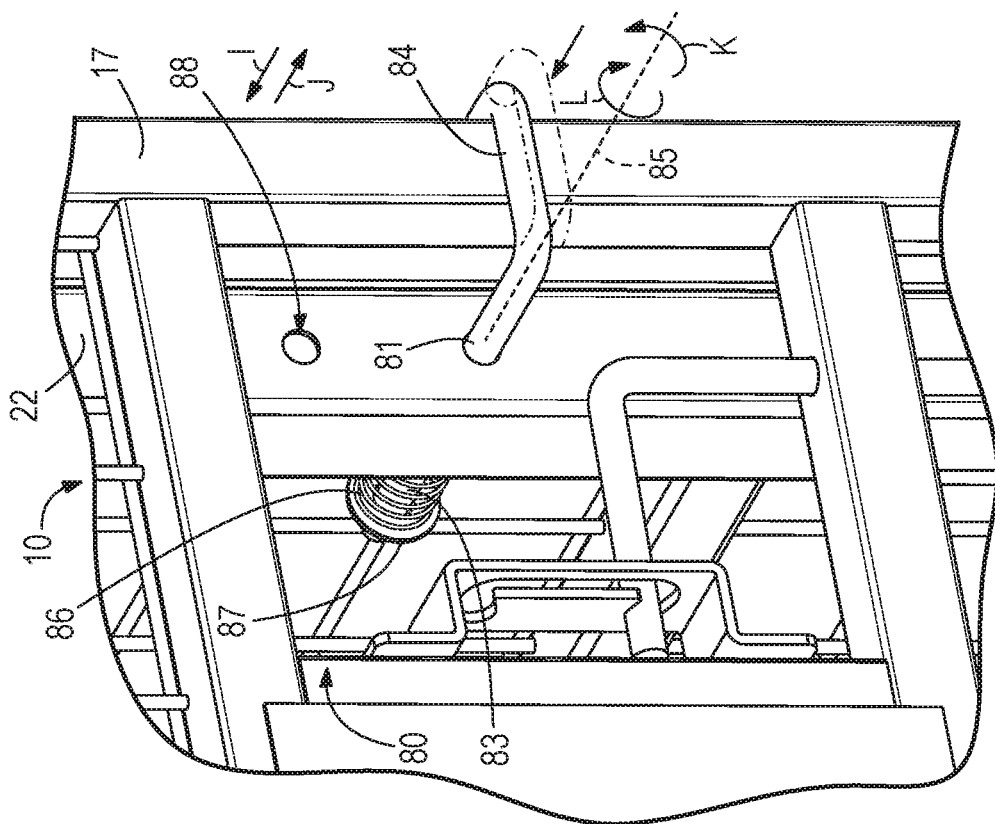
FIGS. 21-22 are perspective views of an example door hold-open latch of the present disclosure in different positions.
Figure 22:
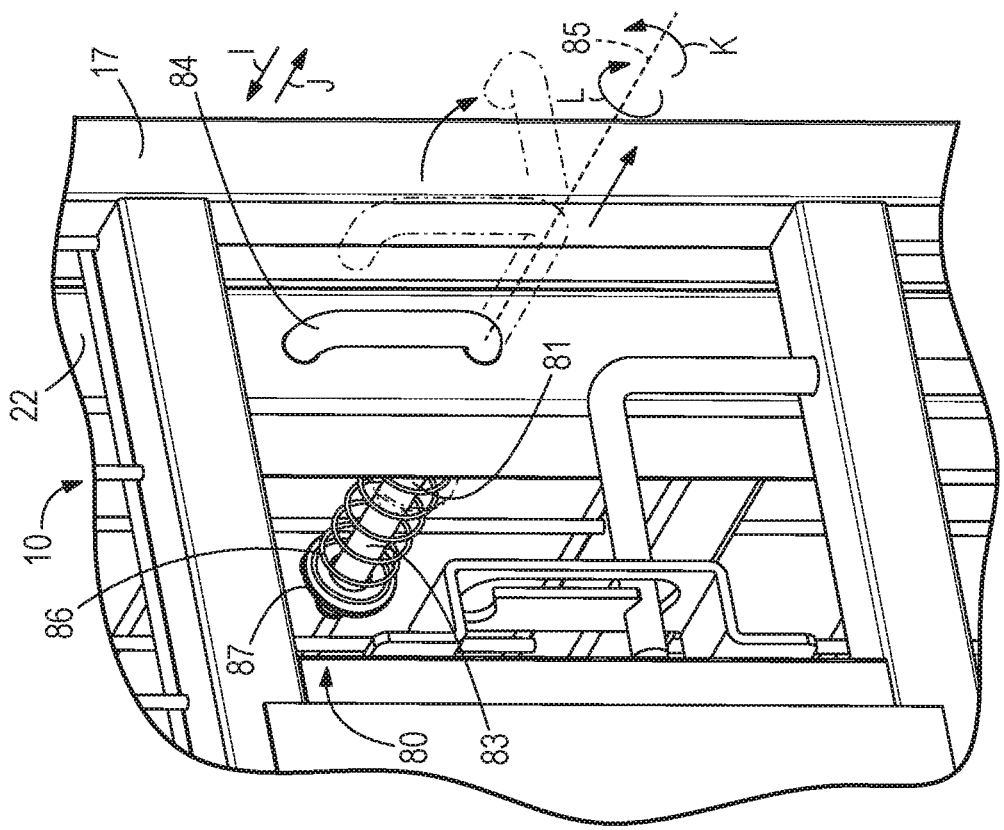

Referring to FIGS. 21-22, the cart 10 has a hold-open latch 80 on the second end wall 22 configured to hold the door 17 in the open position (FIG. 3). Note that the cart 10 can include a second hold-open latch 80 on the first end wall 21 to hold the other door 17 in the open position (FIG. 3). Note that FIGS. 21-22 depict the door 17 in the open position (FIG. 3). The hold-open latch 80 has a hook 81 that extends through the second end wall 22 such that a first end 83 is in the interior space 15 and a hook-shaped opposite second end 84 extends from the exterior surface of the second end wall 22. The hook 81 generally extends along an axis 85 through holes (not shown) in one of the vertical framing members 25 (see FIG. 1) of the second end wall 22. The hold-open latch 80 also has a spring 86 that extends along the hook 81 between a fixed washer 87 at the first end 83 of the hook 81 and the second end wall 22. The spring 86 biases the first end 83 of the hook 81 in a first longitudinal direction (see arrow I) away from the second end wall 22 and the second end 84 in the first longitudinal direction (see arrow I) toward the second end wall 22.

FIG. 21 depicts the door 17 in the open position (FIG. 3) and the hold-open latch 80 in a storage position in which the second end 84 of the hook 81 is in a hook-receiving hole 88 (FIG. 22) in the second end wall 22. To latch the door 17 to the second end wall 22, the employee pulls the second end 84 of the hook 81 away from the second end wall 22 (see arrow J) thereby compressing the spring 86 between the washer 87 and the second end wall 22. The employee then rotates the hook 81 (see arrow L) (e.g., the employee rotates the hook 81 90.0 degrees) such that the second end 84 extends over a framing member of the door 17 (see dashed lines on FIG. 21). The operator then releases the second end 84 and the spring 86 decompresses thereby moving the second end 84 toward the second end wall 22 (see solid lines in FIG. 22; see arrow I) and into engagement with the door 17. FIG. 22 depicts the hold-open latch 80 in a latched position such that the door 17 does not move from the open position (FIG. 3).

To unlatch the door 17 from the second end wall 22, the employee pulls the second end 84 of the hook 81 away from the second end wall 22 (see arrow J) thereby compressing the spring 86 between the second end wall 22 and the fixed washer 87. The employee then rotates the hook 81 (see arrow K) (e.g., the employee rotates the hook 81 90.0 degrees) such that the second end 84 does not extend over a frame member of the door 17. Thus, the door 17 can freely move away from the open position (FIG. 3) toward the closed position (FIG. 1). When the employee releases the second end 84, the spring 86 decompresses and moves the second end 84 toward the second end wall 22 into the storage position (FIG. 21) in which the second end 84 is in the hook-receiving hole 88 (FIG. 22) of the second end wall 22.

Towing Arm

Figure 23:
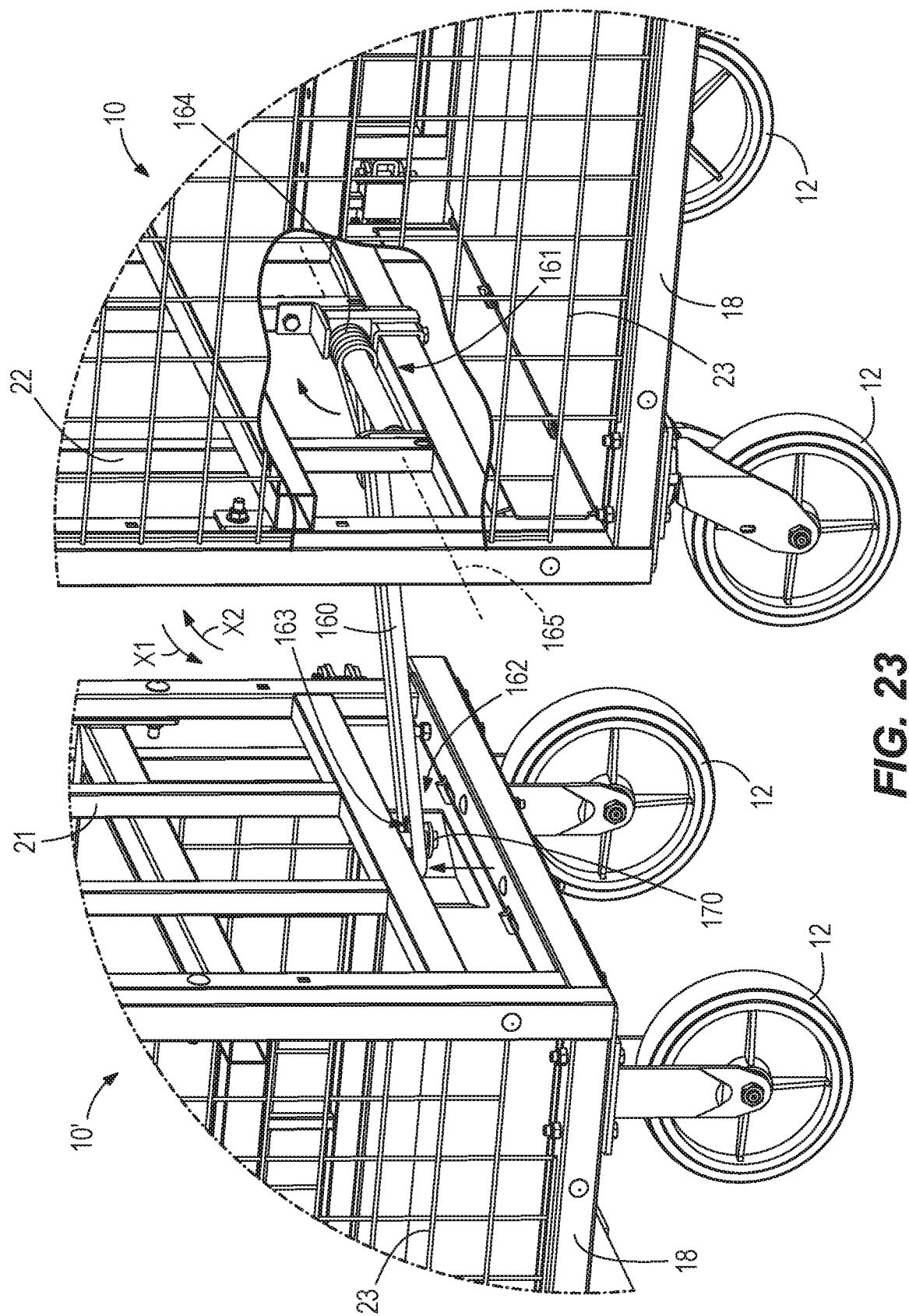
FIG. 23 is a perspective view of a towing arm of a first cart coupled to a mounting arm of a second cart.

Referring to FIG. 23, the cart 10 has a towing arm 160 on the second end wall 22, and the towing arm 160 is for connecting the cart 10 to a second cart 10' or a towing vehicle (not shown; e.g., forklift). The towing arm 150 has a first end 161 pivotally coupled to the second end wall 22 and an opposite second end 162 with a hole 163.

To connect to the towing arm 160 of the cart 10 to the second cart 10', the employee pivots the towing arm 160 in a first direction X1 away from the cart 10 and aligns the hole 163 of the second end 162 with a mounting arm 170 on the second cart 10'. Note that as the employee pivots the towing arm 160 in the first direction X1, a spring 164 extending along a pivot axis 165 of the towing arm 160 compresses. The employee then releases the towing arm 160 such that spring 164 decompresses and pivots the towing arm 160 in a second direction X2. Thus, the first end 161 is moved onto the mounting arm 170 and the mounting arm 170 is in the hole 163 of the first end 161. To disconnect the towing arm 160 from the second cart 10', the employee pivots the towing arm 160 in the first direction X1 such that the first end 161 is off the mounting arm 170. The employee then releases the towing arm 160 and the spring 164 pivots the towing arm 160 in the second direction X2 toward the cart 10 and into a storage position (see FIG. 1).

Figure 24:
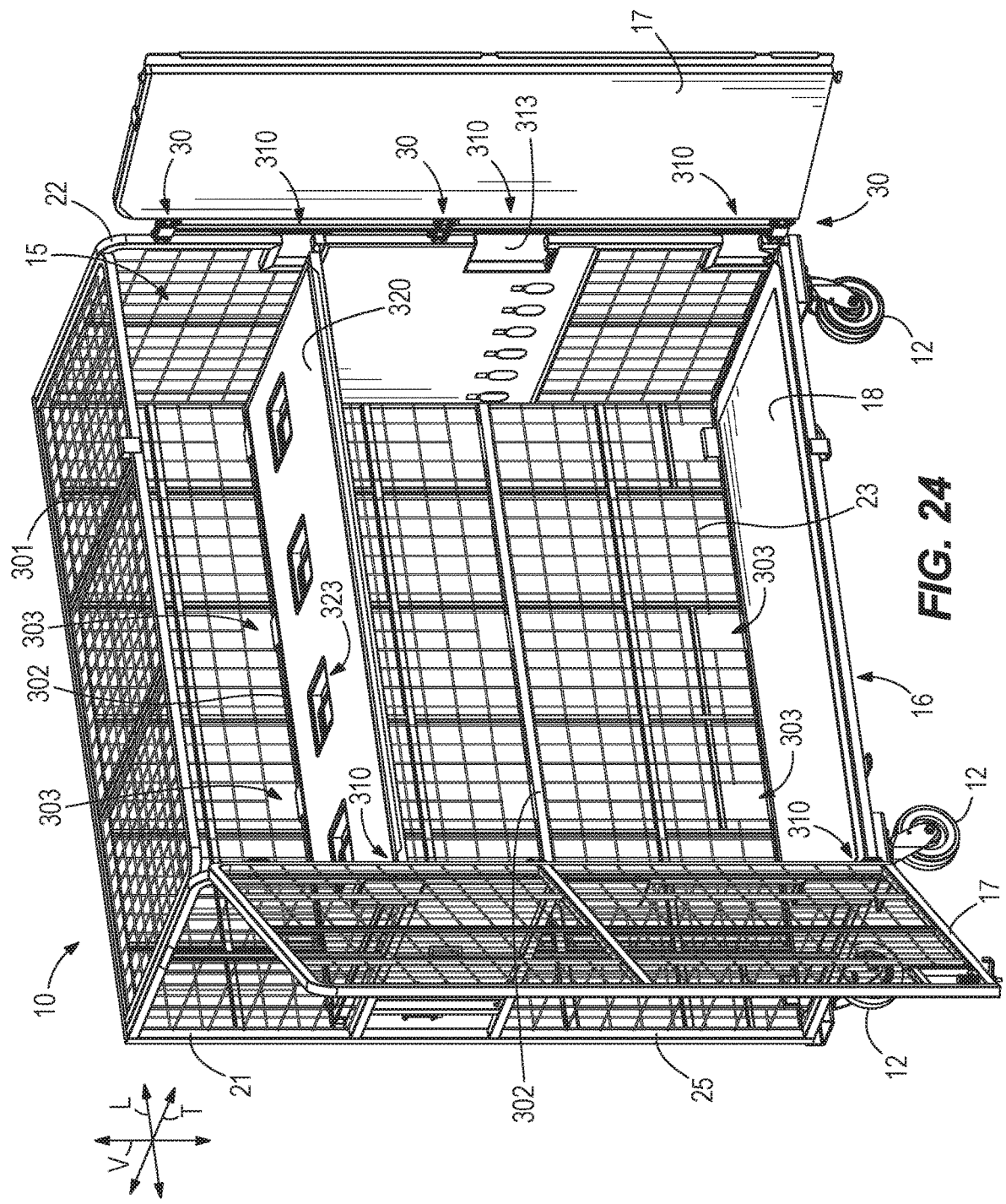
FIGS. 24-25 are perspective views of another example cart of the present disclosure.
Figure 25:
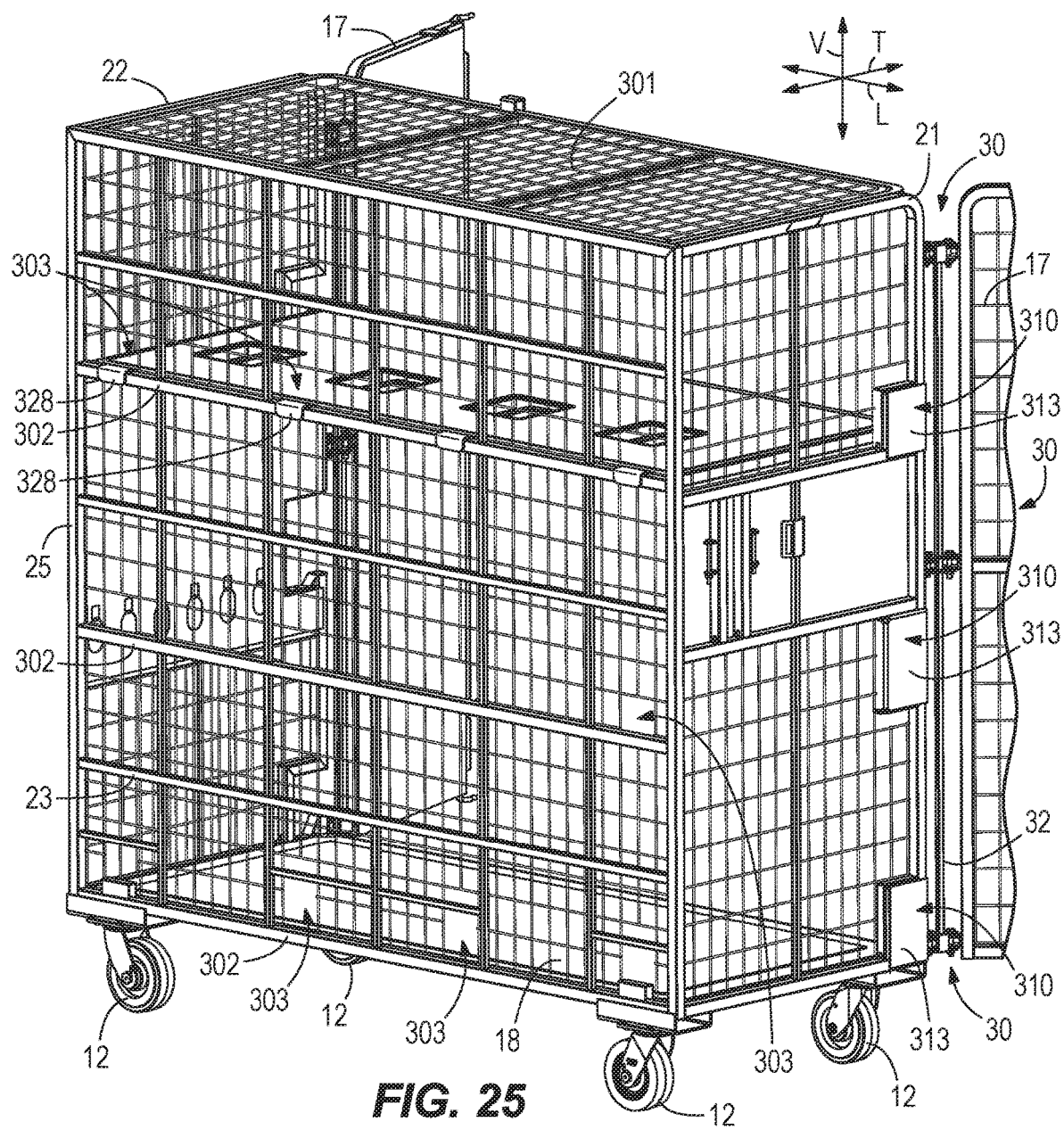

FIGS. 24-25 depict another example cart 10 of the present disclosure with the doors 17 in intermediate positions. The cart 10 has a top panel 301 that includes a plurality of metal framing members and/or wire mesh. The top panel 301 is opposite the base 18 and defines the upper limit of the interior space 15 of the cart 10.

The sidewall 23 includes one or more sidewall rails 302 that longitudinally extend between the end walls 21, 22. The sidewall 23 also includes a plurality of openings 303. Note that the openings 303 in the example cart 10 depicted in FIG. 24 are larger than the standard holes in the wire mesh of the sidewall 23.

Figure 27:
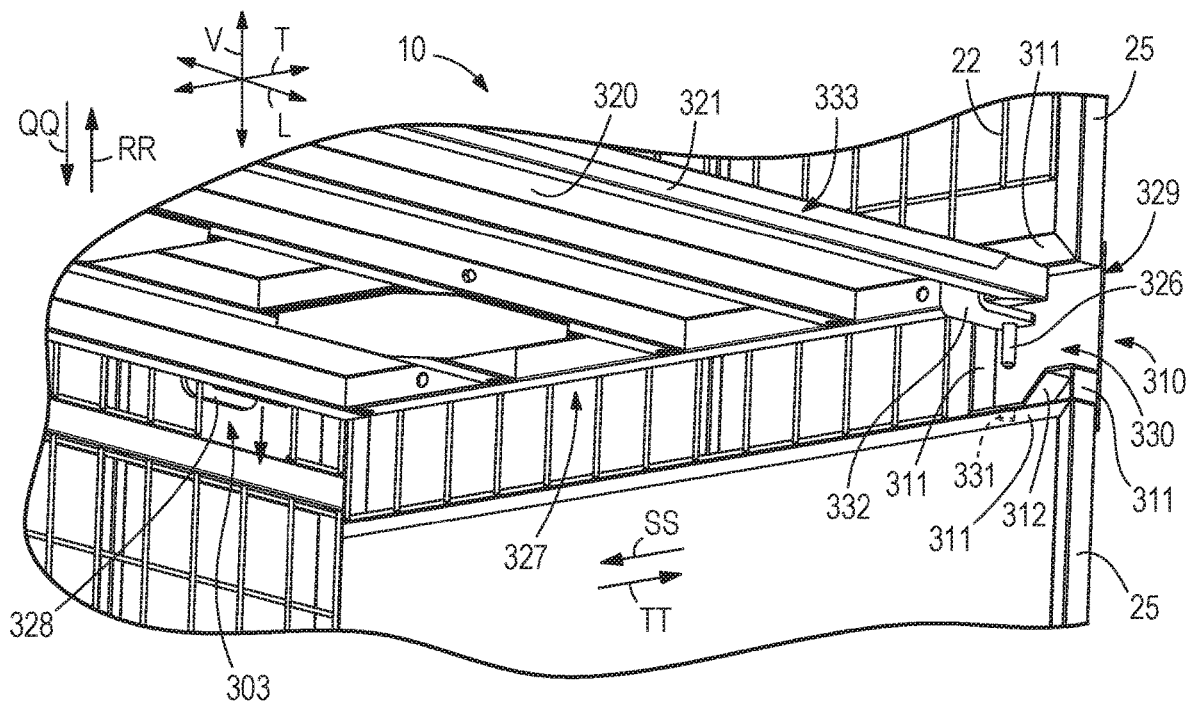
FIGS. 27-28 are enlarged perspective views of the shelf of FIG. 26 in different positions.

Each end walls 21, 22 includes one or more pockets 310 that receive an end of an example shelf 320 or a portion of the shelf 320 (described further herein). The number of pockets 310 can vary, and FIG. 24 depicts three pockets in each end wall 21, 22. The pockets 310 are recessed in the plane of the end walls 21, 22 and do not extend into the interior space 15 of the cart 10. The pockets 310 have a plurality of pocket framing members 311 (FIG. 27-28) and a lip 312 (FIG. 27; described further herein). Each pocket 310 also has a cover plate 313 (FIG. 25).

Figure 26:
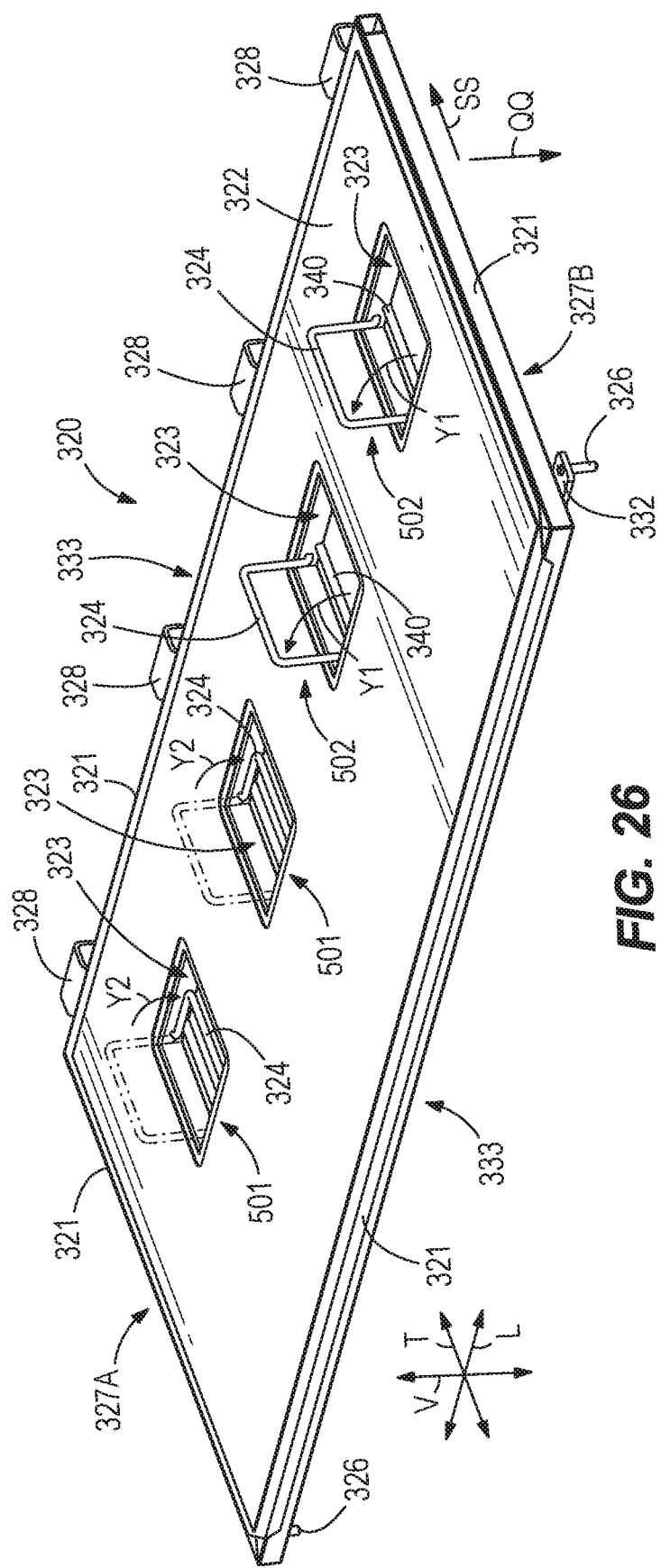
FIG. 26 is a perspective view of an example shelf according to the present disclosure.

FIG. 26 depicts the example shelf 320 depicted in FIG. 24 in greater detail. The shelf 320 includes perimeter rails 321 that define the perimeter edges of the shelf 320. A plate 322 extends between the perimeter rails 321 and thereby defines a support surface on which the employee places objects (not shown) such as boxes. Each end 327A, 327B of the shelf 320A has a pin 236 and a flange 332. In one example, the pin 236 vertically extends from each end 327A, 237B of the shelf 320 and the flange 332 longitudinally extends from each end 327A, 237B of the shelf 320. A plurality of shelf brackets 328 generally extend in a first lateral direction (arrow SS) from a side 333 of the shelf 320. In one example, the shelf brackets 238 are U-shaped. In other examples, the shelf brackets are L-shaped. These components are described herein below.

The shelf 320 has one or more handle cavities 323, and a handle 324 is in each of the handle cavities 323. The employee pivots (see arrow Y1) the handles 324 from a storage position (see arrow 501) in which the handles 324 are recessed in the handle cavities 323 to a lifting position (see arrow 502) in which the handles 324 extend from the handle cavities 323. When one or more handles 324 are in the lifting position, the employee(s) engages the handles 324 to lift and move the shelf 320 (described further herein). Once the employee properly positions the shelf 320 in the interior space 15 of the cart 10 (FIG. 24), the employee pivots the handles 324 (see arrow Y2) to thereby recess the handle 324 into the handle cavity 323 (i.e. the storage position). Thus, the handle 324 does not obstruct the placement of items (not shown) on the shelf 320. A bar 340 is in each handle cavity 323, and the bar 340 prevents the handle 324 from pivoting (see arrow Y2) through the cavity 323 such that the handle 324 extends from the lower surface of the shelf 320.

Figure 28:
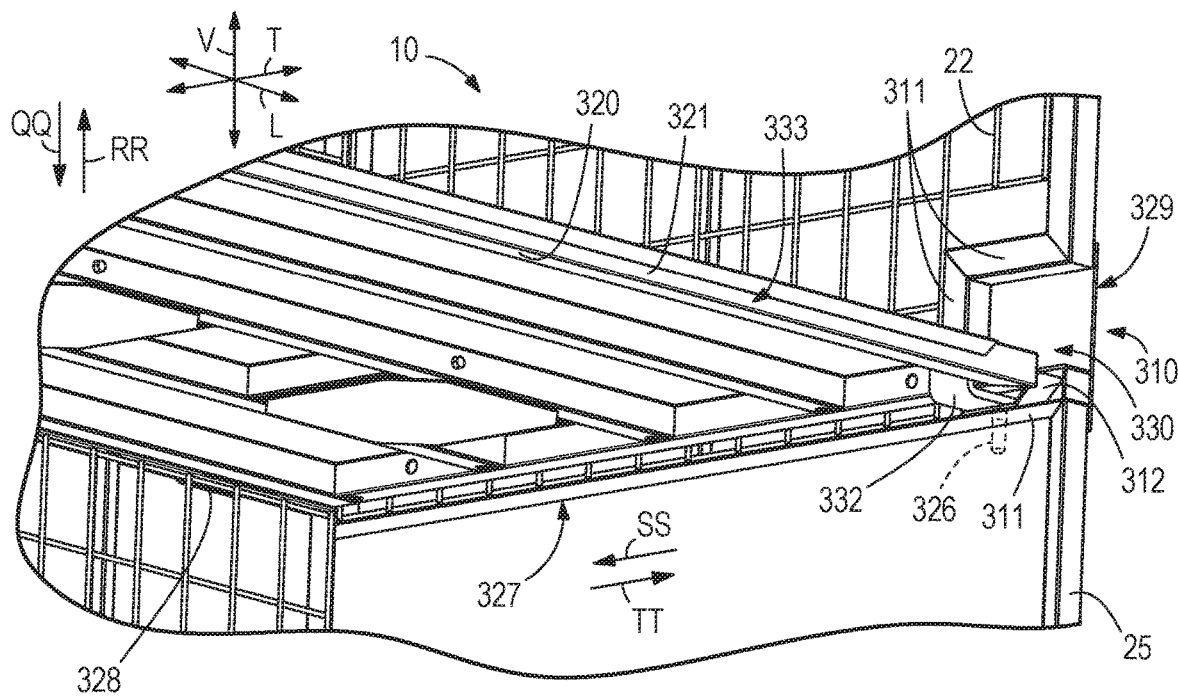

FIGS. 27-28 depict the placement of the shelf 320 into the cart 10 in greater detail. Specifically, FIG. 27 depicts the shelf 320 registered in the interior space 15 of the cart 10 such that the shelf brackets 328 are vertically above the sidewall rail 302 and each pin 326 at the ends 327A, 327B the shelf 320 is in the opposing pockets 310 (see FIG. 24). The employee moves the shelf 320 into the position depicted in FIG. 27 by engaging the handles 324 (FIG. 26) and moving the shelf 320 in the first lateral direction (arrow SS) into the interior space 15 of the cart 10. As the employee moves the shelf 320, the shelf brackets 328 are moved into the openings 303 in the sidewall 23 and the pins 326 are moved into the pockets 310 in the end walls 21, 22 (see also FIG. 24). For example, note that one of the pins 326 is in a pocket 310 in the first end wall 21 (FIG. 24) and the other pin 326 is in a pocket 310 in the second end wall 22. Each pin 326 is moved through a pocket opening 329 in the end wall 22 into the pocket 310. For example, the pocket opening 329 is a gap between vertical framing members 25 of the end wall 22 through which the pin 326 and/or the flange 332 is moved into a void 330 defined by the pocket framing member 311.

The employee then moves the shelf 320 vertically downward (arrow QQ) such that the shelf brackets 328 engage and rest on the sidewall rail 302 (see FIG. 25) and the pins 326 extend through pin receiver holes 331 (see dashed hole 331 in FIG. 27) in one of the pocket framing members 311. Thus, the shelf 320 is in a secured position (FIG. 28) on the cart 10. The shelf brackets 328 and the pins 326 prevent the shelf 320 from inadvertently moving out of the cart 10. In addition, the lip 312 of the pocket 310 prevents the shelf 320 from inadvertently sliding out of the cart 10 in the second lateral direction (arrow TT) in the event the pins 326 come out of the holes 331 (FIG. 27). For example, the lip 312 prevents inadvertent movement of the shelf 320 in the second lateral direction (arrow TT) when the cart 10 passes over large bumps that cause the pins 236 to "jump" out of the holes 331. To remove the shelf 320 from the cart 10, the employee engages the handles 324 (FIG. 26) and moves the shelf 320 vertically upward (arrow RR) and further in the second lateral direction (arrow TT) out of the interior space 15 of the cart 10 (FIG. 24). Note that in one example, the shelf 320 does not include the pins 326 and instead the flanges 332 rest on the pocket framing member 311.

In certain examples, a cart for transporting objects includes a base, a first end wall and an opposite second end wall extending from the base, and a sidewall extending from the base and between the first end wall and the second end wall. The first end wall, the second end wall, and the sidewall define an interior space and a cart opening into the interior space. A hinge couples a door to the first end wall such that the door is pivotable in a first direction to a closed position in which the door extends across the cart opening and an opposite second direction to an open position. The hinge has a body that prevents pivoting of the door in the first direction past the closed position and the second direction past the open position.

In certain examples, when the door is in the closed position, the body is aligned with the door. In certain examples, when the door is in the open position, the body extends transverse to the door. In certain examples, the hinge defines a first axis about which the door is pivoted relative to the body and a second axis about which the body and the door are pivoted relative to the first end wall. In certain examples, when the door is in the closed position the body prevents pivoting of the door about the first axis in the first direction. In certain examples, when the door is in the open position the body prevents pivoting of the door about the second axis in the second direction. In certain examples, the hinge has a first bracket that is fixedly coupled to the door and pivots about the first axis and a second bracket that is fixedly coupled to the first end wall and pivots about the second axis. When the door is in the closed position the first bracket and the second bracket engage a first stop member of the body, and when the door is in the open position the first bracket and the second bracket engage an opposite second stop member of the body. In certain examples, the first stop member and the second stop member are plates that each extend in separate parallel planes.

In certain examples, when the door is in the closed position the first bracket engages a first end of the first stop member and the second bracket engages an opposite second end of the first stop member. In certain examples, when the door is in the open position the second bracket engages a first end of the second stop member and the first bracket engages an opposite second end of the second stop member. In certain examples, when the door is in the open position the first bracket engages a first end of the first stop member. In certain examples, the distance between the first end and a second end of the first stop member is greater than distance between the first end and the second end of the second stop member. In certain examples, the door pivots 270.0 degrees from the closed position to the open position.

In certain examples, a cart for transporting objects includes a base, a first end wall, an opposite second end wall, and a sidewall vertically extending from the base. The sidewall longitudinally extends between the first end wall and the second end wall and the first end wall and the second end wall laterally extends relative to the sidewall. The base, the first end wall, the second end wall, and the sidewall define an interior space and a cart opening. An arm is on the first end wall and in the interior space, and the arm is configured to laterally slide along the first end wall and further vertically pivot relative to the first end wall into a raised position in which the arm longitudinally extends away from the first end wall to thereby retain the objects in the interior space.

In certain examples, the arm is configured to pivot relative to the first end wall into a lowered position in which the arm vertically extends along the first end wall. In certain examples, the first end wall has a rail along which the arm laterally slides. In certain examples, the arm has a tab and the rail has a hole and when the arm is in the raised position the tab is in the hole such that the arm is locked in the raised position. In certain examples, the tab is a first tab and the arm has a second tab such that that the arm is pivotable into an angled position between the lowered position and the raised position. When the arm is in the angled position the second tab is in the hole such that the arm is locked in the angled position. In certain examples, the first tab and the second tab are spaced apart from each other along a base of the arm. In certain examples, the arm is one of a first plurality of arms on the first end wall and the cart further comprises a second plurality of arms on the second end wall. Each arm in the first plurality of arms is configured to pivot relative to the first end wall into raised positions in which the arms longitudinally extend away from the first end wall toward the second end wall to thereby retain the objects in the interior space. Each arm in the second plurality of arms is configured to pivot relative to the second end wall into raised positions in which the arms longitudinally extend from the second end wall toward the first end wall to thereby retain the objects in the interior space.

In certain examples, a cart for transporting objects includes a base, a first end wall, an opposite second end wall, and a sidewall vertically extending from the base. The sidewall longitudinally extends between the first end wall and the second end wall and the first end wall and the second end wall laterally extending from the sidewall. The base, the first end wall, the second end wall, and the sidewall define an interior space and a cart opening into the interior space. A shelf has a first end, an opposite second end, and a shelf bracket between the first end and the second end. The shelf is laterally movable toward the sidewall into the interior space through the cart opening such that the first end is in a pocket of the first end wall, the second end is in a pocket in the second end wall, and the shelf bracket engages the sidewall. The first end wall, the second end wall, and the sidewall support the shelf relative to the base.

In certain examples, the pocket of the first end wall is recessed within the first end wall and the pocket of the second end wall is recessed within the second end wall. In certain examples, the first end wall has a lip that prevents the first end of the shelf from laterally moving away from the sidewall out of the pocket in the first end wall and the second end wall has a lip that prevents the second end of the shelf from laterally moving away from the sidewall out of the pocket in the second end wall. In certain examples, the first end of the shelf has a first pin that is in a pin receiver hole of the first pocket and the second end of the shelf has a second pin that is in a pin receiver hole of the second pocket when the shelf is supported by the first end wall and the second end wall. In certain examples, the first end of the shelf has a first flange that longitudinally extends toward the first end wall. The first pin vertically extends from the first flange toward the base. The second end of the shelf has a second flange that longitudinally extends toward the second end wall. The second pin vertically extends from the second flange toward the base. In certain examples, the sidewall has a sidewall rail and the shelf bracket engages the sidewall rail. In certain examples, the shelf bracket is one of a plurality of shelf brackets, and the shelf brackets in the plurality of shelf brackets are spaced apart from each other along the shelf. In certain examples, the sidewall has an opening through which the shelf bracket extends as the shelf bracket engages the sidewall rail. In certain examples, the shelf has a handle cavity between the first end and the second end and a handle in the handle cavity. The handle is pivotable into and the between a storage position in which handle is recessed in the handle cavity and an extended position in which the handle extends out of the cavity. In certain examples, the handle is pivotable in a first direction into the extended position and a second direction into the recessed position. The shelf has a bar in the handle cavity that prevents the handle from pivoting in the second direction past the recessed position.

In certain examples, the shelf has perimeter rails with a plurality of holes therein. A tray is on the shelf for supporting objects on the shelf, and the tray has a peg that extends into one hole in the plurality of holes to thereby anchor the tray to the shelf. In certain examples, the peg is a first peg and the tray has a second peg that extends into another hole in the plurality of holes to thereby further anchor the tray to the shelf. In certain examples, the tray has a mat formed of compressible material configured to support the objects in the interior space. In certain examples, the tray has a mat with a plurality of vertically extending fingers, and wherein one of the objects rests between two adjacent fingers in the plurality of vertically extending fingers. In certain examples, the cart has a hinge that couples a door to the first end wall such that the door is pivotable in a first direction into a closed position in which the door extends toward the second end wall and an opposite second direction into an open position in which the door extends along the first end wall. The shelf has a door bumper that engages the door when the door is in the closed position to thereby prevent rattling of the door during movement of the cart. In certain examples, the door bumper is spring-biased and applies a force to the door in a direction away from the shelf when the door is in closed position. In certain examples, the shelf has perimeter rails and the door bumper has a bracket laterally extending toward the sidewall, a pin laterally extending from one of the perimeter rails and away from the sidewall, and a spring extending along the pin between the bracket and the perimeter rail. When the door is in the closed position, the door laterally pushes the pin toward the sidewall thereby compressing the spring.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cart for transporting objects, the cart comprising:
a base;
a first end wall, an opposite second end wall, and a sidewall vertically extending from the base, the sidewall longitudinally extending between the first end wall and the second end wall and the first end wall and the second end wall laterally extending from the sidewall, wherein the base, the first end wall, the second end wall, and the sidewall define an interior space and a cart opening; and
a shelf having a first end, an opposite second end, and a shelf bracket between the first end and the second end, wherein the shelf is laterally movable toward the sidewall into the interior space through the cart opening such that the first end is in a pocket of the first end wall, the second end is in a pocket in the second end wall, and the shelf bracket engages the sidewall, and wherein the first end wall, the second end wall, and the sidewall support the shelf.

2. The cart according to claim 1, wherein the pocket of the first end wall is recessed within the first end wall and the pocket of the second end wall is recessed within the second end wall.

3. The cart according to claim 1, wherein the first end wall has a lip that prevents the first end of the shelf from laterally moving away from the sidewall out of the pocket in the first end wall, and wherein the second end wall has a lip that prevents the second end of the shelf from laterally moving away from the sidewall out of the pocket in the second end wall.

4. The cart according to claim 1, wherein the first end of the shelf has a first pin that is in a pin receiver hole of the first pocket and the second end of the shelf has a second pin that is in a pin receiver hole of the second pocket when the shelf is supported by the first end wall and the second end wall.

5. The cart according to claim 4, wherein the first end of the shelf has a first flange that longitudinally extends toward the first end wall and wherein the first pin vertically extends from the first flange toward the base; and
wherein the second end of the shelf has a second flange that longitudinally extends toward the second end wall and wherein the second pin vertically extends from the second flange toward the base.

6. The cart according to claim 1, wherein the sidewall has a sidewall rail, and wherein the shelf bracket engages the sidewall rail.

7. The cart according to claim 6, wherein the shelf bracket is one of a plurality of shelf brackets, and wherein the shelf brackets in the plurality of shelf brackets are spaced apart from each other on the shelf.

8. The cart according to claim 6, wherein the sidewall has an opening through which the shelf bracket extends when the shelf bracket engages the sidewall rail.

9. The cart according to claim 1, wherein the shelf has a handle cavity between the first end and the second end and a handle in the handle cavity, and wherein the handle is pivotable into and the between a storage position in which the handle is recessed in the handle cavity and an extended position in which the handle extends out of the cavity.

10. The cart according to claim 9, wherein the handle is pivotable in a first direction into the extended position and a second direction into the recessed position; and
wherein the shelf has a bar in the handle cavity that prevents the handle from pivoting in the second direction past the recessed position.

11. The cart according to claim 1, wherein the shelf has perimeter rails with a plurality of holes therein, and further comprising a tray on the shelf for supporting objects on the shelf, wherein the tray has a peg that extends into one hole in the plurality of holes to thereby anchor the tray to the shelf.

12. The cart according to claim 11, wherein the peg is a first peg and the tray has a second peg that extends into another hole in the plurality of holes to thereby further anchor the tray to the shelf.

13. The cart according to claim 11, wherein the tray has a mat formed of compressible material configured to support the objects in the interior space.

14. The cart according to claim 11, wherein the tray has a mat with a plurality of vertically extending fingers, and wherein one of the objects rests between two adjacent fingers in the plurality of vertically extending fingers.

15. The cart according to claim 11, wherein the cart further comprises a hinge that couples a door to the first end wall such that the door is pivotable in a first direction into a closed position in which the door extends toward the second end wall and an opposite second direction into an open position; and
wherein the shelf has a door bumper that engages the door when the door is in the closed position to thereby prevent rattling of the door during movement of the cart.

16. The cart according to claim 15, wherein the door bumper is spring-biased and applies a force to the door in a direction away from the shelf when the door is in the closed position.

17. The cart according to claim 16, wherein the door bumper has:
a bracket laterally extending toward the sidewall;
a pin laterally extending from one of the perimeter rails and away from the sidewall; and
a spring extending along the pin between the bracket and the perimeter rail, and wherein when the door is in the closed position, the door laterally pushes the pin toward the sidewall thereby compressing the spring.

* * * * *